(12) United States Patent
Takewaka et al.

(10) Patent No.: US 8,978,797 B2
(45) Date of Patent: Mar. 17, 2015

(54) VEHICLE APPROACH NOTIFICATION DEVICE OF SADDLE-RIDDEN ELECTRIC-POWERED VEHICLE

(75) Inventors: Tomoyuki Takewaka, Wako (JP); Masahiro Akiba, Wako (JP); Ryuji Akiba, Wako (JP); Kazuhiko Tanaka, Wako (JP); Satoru Shimizu, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 285 days.

(21) Appl. No.: 13/580,778

(22) PCT Filed: Feb. 22, 2011

(86) PCT No.: PCT/JP2011/053802
§ 371 (c)(1),
(2), (4) Date: Aug. 23, 2012

(87) PCT Pub. No.: WO2011/105356
PCT Pub. Date: Sep. 1, 2011

(65) Prior Publication Data
US 2012/0312609 A1 Dec. 13, 2012

(30) Foreign Application Priority Data
Feb. 23, 2010 (JP) ................................ 2010-037452

(51) Int. Cl.
*B60Q 1/54* (2006.01)
*B62J 3/00* (2006.01)
(Continued)

(52) U.S. Cl.
CPC . *B62J 3/00* (2013.01); *B60Q 5/008* (2013.01); *B62J 17/02* (2013.01); *B60Q 1/54* (2013.01); *B62K 2202/00* (2013.01); *B62K 2204/00* (2013.01)

USPC .... 180/65.1; 340/466; 340/384.1; 340/425.5; 340/435; 340/474; 381/86

(58) Field of Classification Search
None
See application file for complete search history.

(56) References Cited

U.S. PATENT DOCUMENTS 5,261,006 A * 11/1993 Nieuwendijk et al. ........ 381/353
5,517,173 A * 5/1996 Cha et al. ................... 340/404.1
(Continued)

FOREIGN PATENT DOCUMENTS

CN 1930593 A 3/2007
JP 06-037088 U 5/1994
(Continued)

OTHER PUBLICATIONS

International Search Report of PCT/JP2011/053802, mailing date May 31, 2011.
(Continued)

*Primary Examiner* — J. Allen Shriver, II
*Assistant Examiner* — Hilary L Johns
(74) *Attorney, Agent, or Firm* — Westerman, Hattori, Daniels & Adrian, LLP

(57) ABSTRACT

Provided is a vehicle approach notification device of a saddle-ridden electric-powered vehicle that outputs a notification sound for notifying the approach of a vehicle. The saddle-ridden electric-powered vehicle includes a front cover that covers the periphery of a head pipe of a vehicle body frame. The sound emission device is located inside the front cover, the front cover has an air opening for taking in air from an outside, and a ventilation passage that is a passage of the air from the air opening and is used for cooling at least one of a power engine of the saddle-ridden electric-powered vehicle and electric components, and the sound emission device is arranged in the ventilation passage.

6 Claims, 14 Drawing Sheets

(51) Int. Cl.
*B60Q 5/00* (2006.01)
*B62J 17/02* (2006.01)

(56) References Cited

U.S. PATENT DOCUMENTS

| | | | | |
|---|---|---|---|---|
| 5,577,747 | A | * | 11/1996 | Ogawa et al. ............... 180/220 |
| 5,594,411 | A | * | 1/1997 | Ono .......................... 340/425.5 |
| 5,635,903 | A | * | 6/1997 | Koike et al. ................. 340/441 |
| 6,462,261 | B1 | * | 10/2002 | Smith ........................... 84/377 |
| 7,979,147 | B1 | * | 7/2011 | Dunn ............................. 700/94 |
| 2009/0080672 | A1 | * | 3/2009 | Smith ............................ 381/86 |
| 2009/0178870 | A1 | * | 7/2009 | Takahashi et al. .......... 180/229 |

FOREIGN PATENT DOCUMENTS

| | | |
|---|---|---|
| JP | 07-137578 A | 5/1995 |
| JP | 2000-001142 A | 1/2000 |
| JP | 2003-252267 A | 9/2003 |
| JP | 2011-011662 A | 1/2011 |

OTHER PUBLICATIONS

Chinese Office Action dated Sep. 30, 2013, issued in corresponding Chinese Patent Application No. 201180010383.5, w/ partial English translation.

* cited by examiner

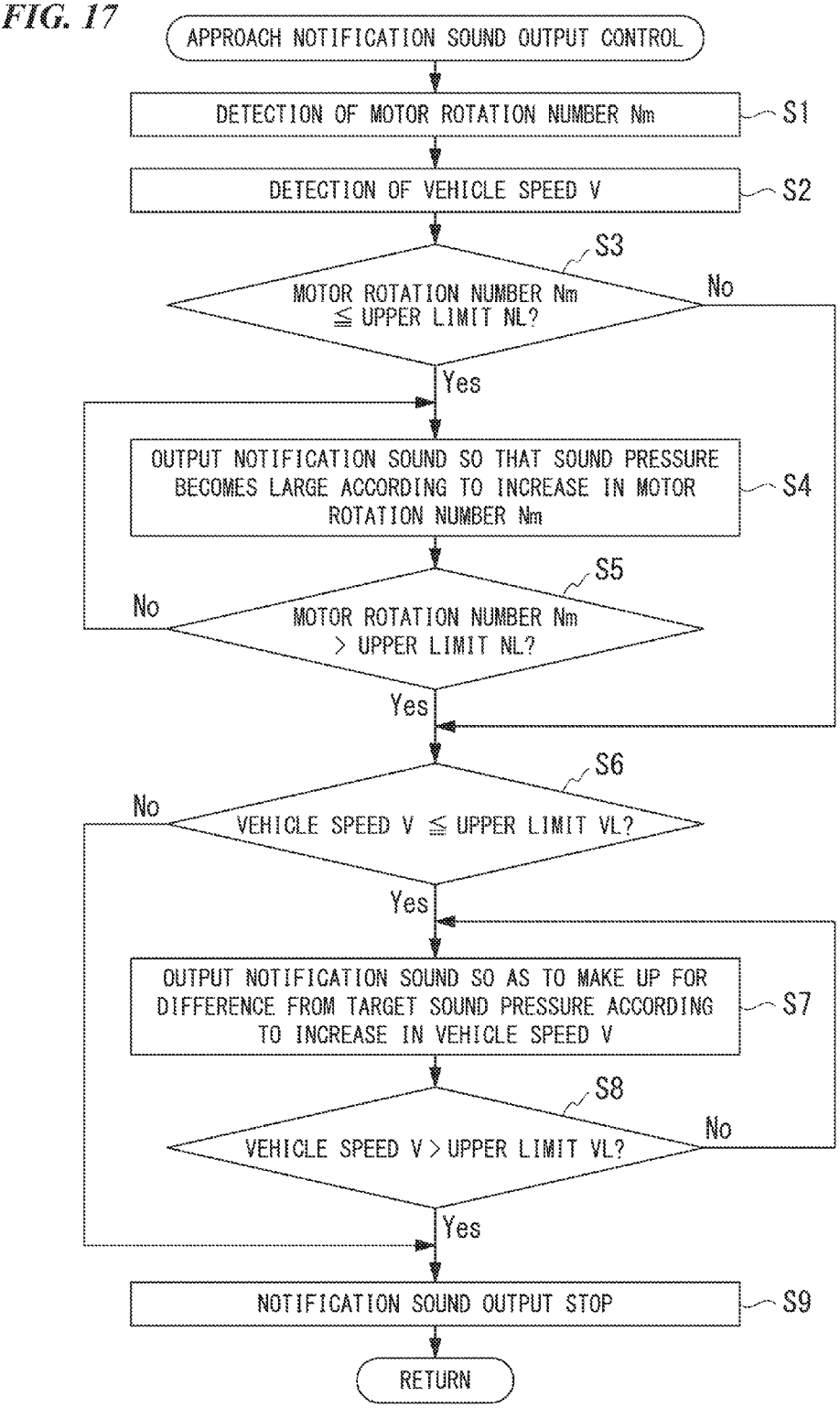

VEHICLE APPROACH NOTIFICATION DEVICE OF SADDLE-RIDDEN ELECTRIC-POWERED VEHICLE

TECHNICAL FIELD

The present invention relates to a vehicle approach notification device of a saddle-ridden electric-powered vehicle that generates a simulation sound which is audible for a rider or a pedestrian.

Priority is claimed on Japanese Patent Application No. 2010-037452, filed Feb. 23, 2010, the content of which is incorporated herein by reference.

BACKGROUND ART

In motor drive vehicles, it is known that the sound generated from a motorcycle is low. In order to notify that a vehicle is approaching, it is preferable that the sound generated from the motorcycle be louder like a gasoline engine. Thus, an automobile on which a sound emission device is mounted (vehicle approach notification device) that generates simulation sound or the like is disclosed (for example, refer to FIG. 11 of Patent Document 1).

As shown in FIG. 11 of Patent Document 1, an electric vehicle (31) (numerals in parentheses show reference numerals described in Patent Document 1; the same hereinbelow) includes a motor drive unit (32) and travels using the power of the motor. Additionally, the electric vehicle (31) is equipped with a sound emission device (3) including an amplifier (16), sound emission control means (12), and the like, and emits sound from a speaker (17) according to a vehicle speed.

However, in the electrical sound emission device (3), in order to generate sound, electric power is consumed, and the parts of the amplifier (16) and the sound emission control means (12) are required. Thus, a sound emission device that does not require electric power is also proposed (for example, refer to FIG. 1 of Patent Document 2).

As shown in FIG. 1 of Patent Document 2, in the sound emission device, winds are collected by an air collection pipe (1), and the collected winds blow on an end of a U-shaped pipe (4) to generate sound.

As the air collection pipe (1) has a large diameter, a large amount of winds can be collected. However, it is difficult in terms of space to mount the large-diameter air collection pipe (1) on a small vehicle, such as a motorcycle.

That is, a vehicle approach notification device, which is compact, efficient, and suitable for a motorcycle or the like, taking into consideration a reduction in power consumption or the number of parts, is required.

Additionally, when the speaker (sound emission device) is attached to a two-wheeled electric vehicle or the like with a little surplus space as compared to a four-wheeled vehicle, a very large speaker cannot be applied. Therefore, even in a case where a relatively small speaker is used, an arrangement in which a high notification effect is obtained is desired.

Moreover, in the case of a two-wheeled vehicle or the like, there are limitations to setting the speaker apart from the rider, and the balance between a reduction in audibility to the rider and the volume of notification to the surroundings that is the original purpose is difficult, an improvement in such a point is also anticipated.

CITATION LIST

Patent Literature

[Patent Document 1] Japanese Unexamined Patent Application Publication No. 2000-1142

[Patent Document 2] Japanese Unexamined Patent Application Publication No. 7-137578

SUMMARY OF INVENTION

Problem to be Solved by the Invention

An object of the invention is to provide a vehicle approach notification device of a saddle-ridden electric-powered vehicle that is compact, efficient, and suitable for small vehicles, such as a two-wheeled vehicle, taking into consideration a reduction in power consumption or the number of parts.

Means for Solving the Problem (a) An aspect of the invention is to provide a vehicle approach notification device (40, 40', 40") of a saddle-ridden electric-powered vehicle, which is attached to a saddle-ridden electric-powered vehicle (10) having a vehicle body cover (32) that covers a vehicle body (24). The vehicle approach notification device includes an air opening (41, 84) that is formed in the vehicle body cover (32) for taking in air from an outside; a ventilation passage (42, 85) that is formed in the vehicle body cover (32) for passing air taken in from the air opening (41, 84) therethrough; and a sound emission device (36, 36') that is arranged in the ventilation passage (42, 85) and emits sound by means of an airflow that passes through the ventilation passage (42, 85).

In addition, the saddle-ridden electric-powered vehicle includes electric-powered vehicles in general, on which a rider rides straddling a vehicle body, and includes not only two-wheeled vehicles (including scooter type vehicles) but also three-wheeled vehicles (also including front two-wheeled and rear one-wheeled vehicles in addition to front one-wheeled and rear two-wheeled vehicles) or four-wheeled vehicles.

(b) In the aspect described in the above (a), the sound emission device (36, 36') may be arranged inside the vehicle body cover (32).

(c) In the aspect described in the above (a), the ventilation passage (42, 85) may be a ventilation passage for cooling used for cooling at least one of a power engine (31) and electric components (23, 25) of the saddle-ridden electric-powered vehicle (10).

(d) In the aspect described in the above (a), the vehicle body cover (32) may be a front cover (33) that covers a front side of the vehicle body (24).

(e) In the aspect described in the above (a), a plurality of the sound emission devices (36, 36') that emit sounds with mutually different generation frequencies may be provided.

(f) In the aspect described in the above (a), the sound emission device (36) may be a Helmholtz resonator having a resonant chamber (44) and a resonant tube (45).

(g) In the case described in the above (f), a configuration may be adopted in which the resonant chamber (44) is covered with the vehicle body cover (32), and the resonant tube (44) opens into the ventilation passage (42) in a direction intersecting the ventilation passage (42).

(h) In the aspect described in the above (f), the resonant tube (45) may extend from the resonant chamber (44) and may open vertically downward.

(i) In the case described in the above (f), the generation frequency of emitted sound of the Helmholtz resonator that is the sound emission device (36) may be from 100 Hz to 800 Hz.

(j) In the aspect described in the above (a), the sound emission device (36') may be a harmonica that emits sound by vibrating a plurality of reeds (75 to 80) by means of an airflow.

(k) In the case described in the above (j), the frequency range of emitted sound of the harmonica that is the sound emission device (36) may be from 100 Hz to 2500 Hz.

(l) Another aspect of the invention is to provide a vehicle approach notification device (40, 40', 140, 250) of a saddle-ridden electric-powered vehicle that has a sound emission device (36, 36', 160, 251) attached to a vehicle body of a saddle-ridden electric-powered vehicle (10, 101, 201) including an electric motor in a power engine (31, 103M) and that outputs a notification sound for notifying approach of the saddle-ridden electric-powered vehicle (10, 101, 201) from the sound emission device (36, 36', 160, 251) to the surroundings. The saddle-ridden electric-powered vehicle (10, 101, 201) includes a front cover (33, 121a, 207A) that covers the periphery of the head pipe (12, 112, 236) of the vehicle body frame (11, 111, 234). The sound emission device (36, 36', 160, 251) is located inside the front cover (33, 121a, 207A). The front cover (33, 121a, 207A) is provided with an air opening (41, 143a, 245a) for taking in air from an outside. The ventilation passage (42, 143b, 243) that is a passage of the air taken in from the air opening (41, 143a, 245a), and is used for cooling at least one of a power engine (31, 103, M) and electric components (23, 135, 252, 260, 25, 102, 248) of the saddle-ridden electric-powered vehicle (10, 101, 201). The sound emission device (36, 36', 160, 251) is arranged in the ventilation passage (42, 143b, 243).

(m) In the aspect described in the above (l), the sound emission device (36', 36, 160, 251) may be arranged at an upper portion of the ventilation passage (42, 143b, 243) and may emit sound into the ventilation passage (42, 143b, 243).

(n) In the aspect described in the above (l), the ventilation passage (143b, 243) may be formed by a duct (143, 245) that extends from a front position of the head pipe (112, 236) to a rearward position within the front cover (121a, 207A), and the sound emission device (160, 251) may be arranged at an upper wall portion of the duct (143, 245) and may emit sound into the ventilation passage (143b, 243).

(o) In the aspect described in the above (l), the duct (143, 245) may be a wind guide duct that crosses a side of the head pipe (112, 236), and may open toward a front of the vehicle.

(p) In the aspect described in the above (l), a configuration may be adopted in which upper portions of front forks (14, 106, 202) that extend obliquely forward and downward in order to hang a front wheel (15, 105, WF) are steerably supported by the head pipe (12, 112, 236), and at least a portion of the sound emission device (36, 36', 160, 251) is arranged ahead of an axis (14a, 106c, 202a) of the front forks (14, 106, 202).

(q) In the aspect described in the above (l), the duct (143, 245) may be a cooling duct that cools a battery (102, 248) for traveling.

(r) In the case described in the above (l), the frequency of emitted sound of the sound emission device (160, 251) may be from 100 Hz to 800 HZ.

Effects of the Invention

According to the aspect of the above (a), since the airflow of the ventilation passage formed in the vehicle body cover is used, it is not necessary to separately provide a air collection tube, and compactness of the notification device can be achieved.

In addition, since the electric components for the notification device are not required, the costs of the notification device can be reduced.

Moreover, since the notification device does not consume electric power, this device can contribute to improvement in the cruising distance with one charge of the electric-powered vehicle.

In the above (b), since the sound emission device is stored in the vehicle body cover, the outer shape of the vehicle can be favorably maintained.

In the above (c), since the sound emission device emits sound using a cooling wind, the cooling wind can be efficiently used.

In the above (d), since air is taken in from the opening at the front of the vehicle, a traveling wind can be efficiently taken in.

In the above (e), by causing sound with a plurality of frequencies to be generated, the sound similar to that of an internal combustion engine can be emitted, and a pedestrian can be made to recognize the vehicle easily.

In addition, the sound that a rider can enjoy can be emitted using a chord or the like as the sound to be emitted.

In the above (f), since sound is emitted even at low speed to medium speed flow, a structure is simple, and there is a degree of freedom in the shape of the resonant chamber, a shape to be arranged in a narrow space can be obtained, and the space within the vehicle body cover can be effectively utilized.

In addition, since the Helmholtz resonator is used, sound can be emitted with energy loss being made small.

In the above (g), the space within the vehicle body cover can be effectively utilized, and it is possible to arrange the sound emission device so that sound is easily emitted toward the ventilation passage.

In the above (h), since the resonant tube opens downward, entering of water into the resonant chamber or the like can be prevented.

In addition, since water falls from the resonant tube even if water enters the resonant chamber, it is not necessary to separately provide a drain hole, and the processing costs of the Helmholtz resonator can be reduced.

In the above (i), since the generation frequency of the intake or exhaust sound of an internal combustion engine is usually from 100 Hz to 800 Hz, if the generation frequency is 100 Hz to 800 Hz, this sound is close to intake or exhaust sound of the internal combustion engine. Thus, people can be made to easily recognize this sound. Additionally, the sound may be made relatively non-jarring even for the rider.

In the above (j), since it is easy to emit sound even using a minute airflow if the sound emission device is the harmonica, sound can be emitted even if the vehicle speed is slow.

In addition, since a plurality of different reeds is provided, sound with a plurality of frequencies can be emitted.

In the above (k), usually, as for the generation frequency of the internal combustion engine, the contribution of a band width from 100 Hz to 2500 Hz is large, and a frequency range that is higher than 2500 Hz may be sensed as a jarring sound for people. Therefore, a pedestrian or a rider can be made to appropriately recognize sound with the frequency band of the sound of the internal combustion engine by adopting a range of 100 Hz to 2500 Hz.

According to the aspect of the above (l), since the sound emission device is stored within the front cover, the outer shape of the vehicle can be favorably maintained and the sound emission device can be protected by the front cover. Additionally, since the sound that the sound emission device emits can be propagated, efficiently using the directivity possessed by the ventilation passage formed within the front cover, and opening to the outside of the cover, sound emission energy can be made relatively small, and this notification device can be made compact. Moreover, audibility to a rider can be reduced by emitting sound through the ventilation passage that opens to the outside of the cover. Moreover, since the sound that the sound emission device emits is propagated using the ventilation passage for cooling of the apparatus, the number of parts can be reduced as compared to a case where a sound propagation member is separately provided.

In the case of the above (m), sound can be efficiently released to the outside of the vehicle using the ventilation passage, and the water or the like that has entered the ventilation passage can be deterred from falling on the sound emission device.

In the above (n), since the sound of the sound emission device can be more efficiently propagated by the duct and the directivity of the sound to the outside of the vehicle is further raised, audibility to a rider can be further reduced.

In the above (o), sound can be efficiently propagated to the vehicle front using the wind guide duct for taking in cooling air from the vehicle front. Additionally, transmission of the alert sound to a rider can be further reduced by releasing sound to the outside of the vehicle from the opening that is spaced from the position of the rider's ears and faces the direction opposite to the position of the ears.

In the case of the above (p), by arranging the sound emission device ahead of the axis of the front forks below the head pipe, the sound emission device can be efficiently arranged at a position distanced from the position of rider's ears, and transmission of the notification sound to a rider can be further reduced.

In the case of the above (q), an increase in the number of parts can be suppressed while enabling sound to be efficiently propagated, by using the cooling duct of the battery for traveling as a propagation member of sound.

In the case of the above (r), the notification sound can be emitted using a sound range that is easier to catch.

BRIEF DESCRIPTION OF DRAWINGS

FIG. 17 is a flowchart showing the procedure of notification sound output control.

DESCRIPTION OF EMBODIMENTS

Figure 1:
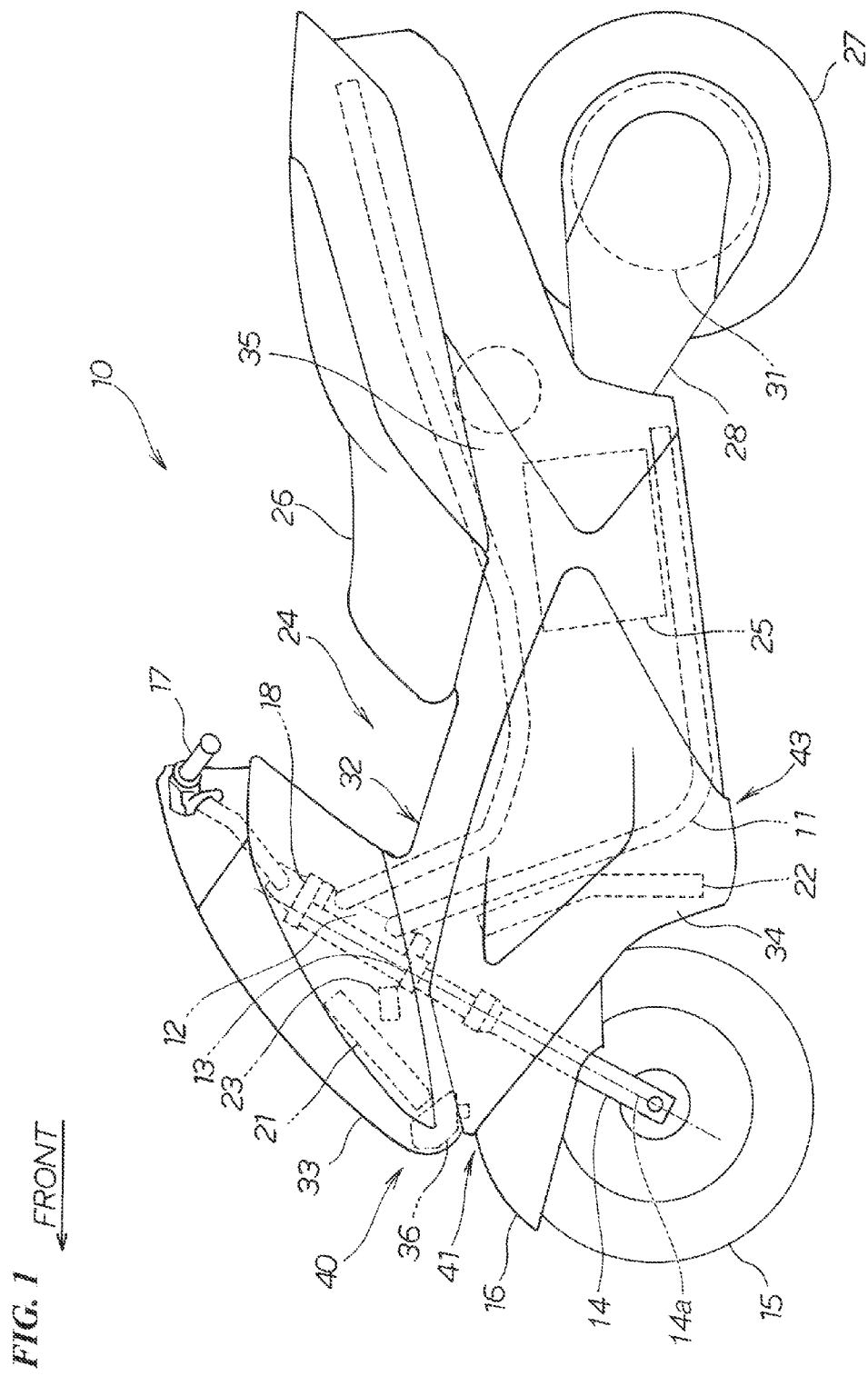
FIG. 1 is a left side view of a motorcycle to which a vehicle approach notification device of a saddle-ridden electric-powered vehicle in a first embodiment of the invention is applied.

Hereinafter, embodiments of the invention will be described with reference to the accompanying drawings. In addition, the drawings shall be seen from the viewpoint of reference numerals. Additionally, the right and left and the front and rear mean directions seen from a rider.

First Embodiment

First, a first embodiment of the invention will be described with reference to FIGS. 1 to 5.

As shown in FIG. 1, a motorcycle 10 as a saddle-ridden electric-powered vehicle includes a vehicle body frame 11, a head pipe 12 provided at the tip of the vehicle body frame 11, a pair of right and left front forks 14 steerably attached to the head pipe 12 via a bottom bridge 13 and being retractable in the longitudinal direction, a front wheel 15 rotatably attached to lower ends of the right and left front forks 14, and a front fender 16 that is attached to the right and left front forks 14 and blocks mud or stone splashed by the front wheel 15. In addition, reference numeral 14*a* in the drawings designates the central axis of the front forks 14.

A steering handle 17 that steers the front wheel 15 is provided at an upper portion of the head pipe 12 via a top bridge 18. A front portion radiator 21 is arranged ahead of the head pipe 12, and a lower radiator 22 is arranged below the head pipe 12. Electric components 23, such as a regulator, are arranged ahead of the head pipe 12.

A fuel cell 25 is supported on the vehicle body frame 11 in the vicinity of the center of a vehicle body 24. A seat 26 on which a rider is seated is disposed above the fuel cell 25. A swing arm 28 that supports a rear wheel 27 is provided at a rear part of the vehicle body 24 to swing freely, and the swing arm 28 is provided with an electric motor 31 that generates a traveling driving force.

A vehicle body cover 32 that covers the vehicle body 24 has a front cover 33 that covers the front side (the periphery of the head pipe 12) of the vehicle body 24, a lower cover 34 that covers the lower side of the vehicle body 24, and a side cover 35 that covers a side part of the vehicle body 24. The front cover 33 may also include a region in the side cover 35 that faces the vehicle front and a region that is joined to the region from the rear (region from the front end of the vehicle body cover 32 to a front end of a low-floor straddling portion ahead of the seat 26).

A Helmholtz resonator 36 as a sound emission device is arranged inside the front cover 33 on the front side of the vehicle body 24.

In addition, the Helmholtz resonator 36 may be arranged on a ventilation passage provided in an outer swelling portion of the side cover 35 of the motorcycle 10.

Next, the ventilation passage will be described.

Figure 2:
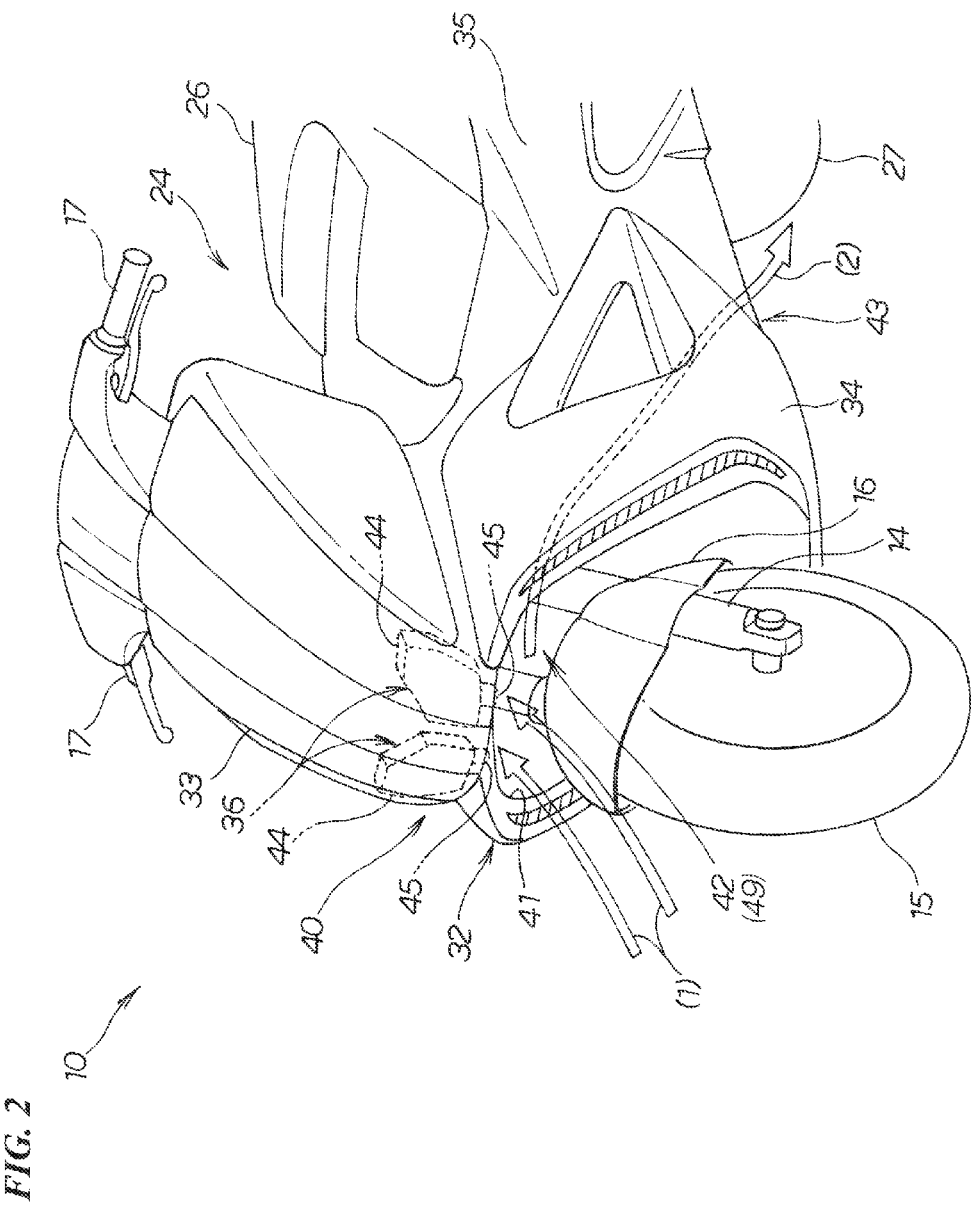
FIG. 2 is a perspective view of the motorcycle in which a Helmholtz resonator mounted on the vehicle approach notification device.

As shown in FIG. 2, a vehicle approach notification device 40 used for the motorcycle 10 has an air opening 41 that is formed in the vehicle body cover 32 for taking in air from the outside, a ventilation passage 42 that is formed in the vehicle body cover 32 for passing air from the air opening 41 therethrough, and the Helmholtz resonator 36 as a sound emission device that is arranged in the ventilation passage 42 and emits sound by means of an airflow that passes through the ventilation passage. In addition, a region where the air opening 41 and the ventilation passage 42 in the vehicle body cover 32 are formed shall be defined as a duct part 49.

The ventilation passage 42 is a ventilation passage for cooling to be used for cooling at least one of the power engine (electric motor 31), the electric components 23, and the fuel cell 25. In addition, in the case of the electric-powered vehicle that travels using accumulated electric power to a battery, a ventilation passage for cooling the battery is also included in the ventilation passage 42.

If the motorcycle 10 travels, air enters as per arrow (1) from the air opening 41, and this air flows through the ventilation passage 42 as per arrow (2), and comes out from the air outlet 43 to the outside. In this case, absorption of heat from the lower radiator 22 is made.

The motorcycle 10 is provided with a plurality of the Helmholtz resonators 36 with mutually different generation frequencies.

The Helmholtz resonator 36 has a resonant chamber 44 and a resonant tube 45. The resonant chamber 44 is covered with the front cover 33, and the resonant tube 45 opens to the ventilation passage 42 in a direction intersecting the ventilation passage 42. The resonant tube 45 extends from the resonant chamber 44 and opens downward.

By causing the respective Helmholtz resonators 36 to generate sound with a plurality of frequencies, the sound similar to that of an internal combustion engine can be emitted, and a pedestrian can be made to recognize the vehicle easily.

Next, the Helmholtz resonator 36 will be described.

Figure 3:
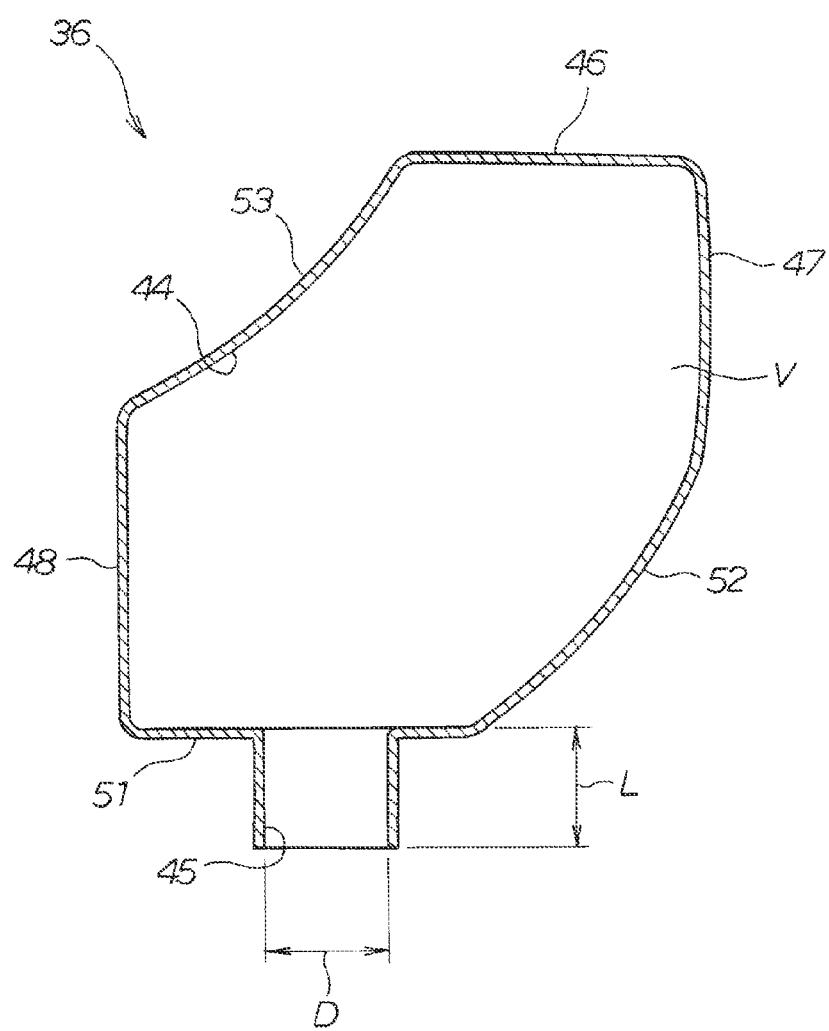
FIG. 3 is a cross-sectional view of the Helmholtz resonator.

As shown in FIG. 3, the Helmholtz resonator 36 which is a sound emission device has the resonant chamber 44 that becomes a cavity, and the resonant tube 45 that extends from the resonant chamber 44. The volume of the resonant chamber 44 is V, the length of the resonant tube 45 is L, and the internal diameter of the resonant tube 45 is D. The resonant chamber 44 assumes such a shape that the resonant chamber can be arranged inside the vehicle body cover 32, has an upper face portion 46, vertical wall portions 47 and 48, a bottom face portion 51, a first curved portion 52, and a second curved portion 53, and has a form matching with the outer shape of the vehicle body cover 32.

The Helmholtz resonator 36 can adjust its generation frequency by changing the volume V, the length L, the internal diameter D, and the shape of the resonant chamber 44. In the present embodiment, the Helmholtz resonator 36 is set from 100 Hz to 800 Hz that is a main frequency range of intake or exhaust sound of an internal combustion engine.

In addition, the shape of the Helmholtz resonator 36 is not limited only to the above-described shape, and may have other shapes.

Additionally, as the generation frequency, frequencies other than the aforementioned 100 Hz to 800 Hz may be set depending on circumstances, or depending on rider's preference.

Additionally, the Helmholtz resonator 36 may be adapted to issue, in a pseudo manner, a frequency rise when the length L of the resonant tube 45 is made variable according to the traveling speed of the motorcycle 10 and engine rotation number rises.

Next, the generation frequency of the Helmholtz resonator 36 will be described.

Figure 4:
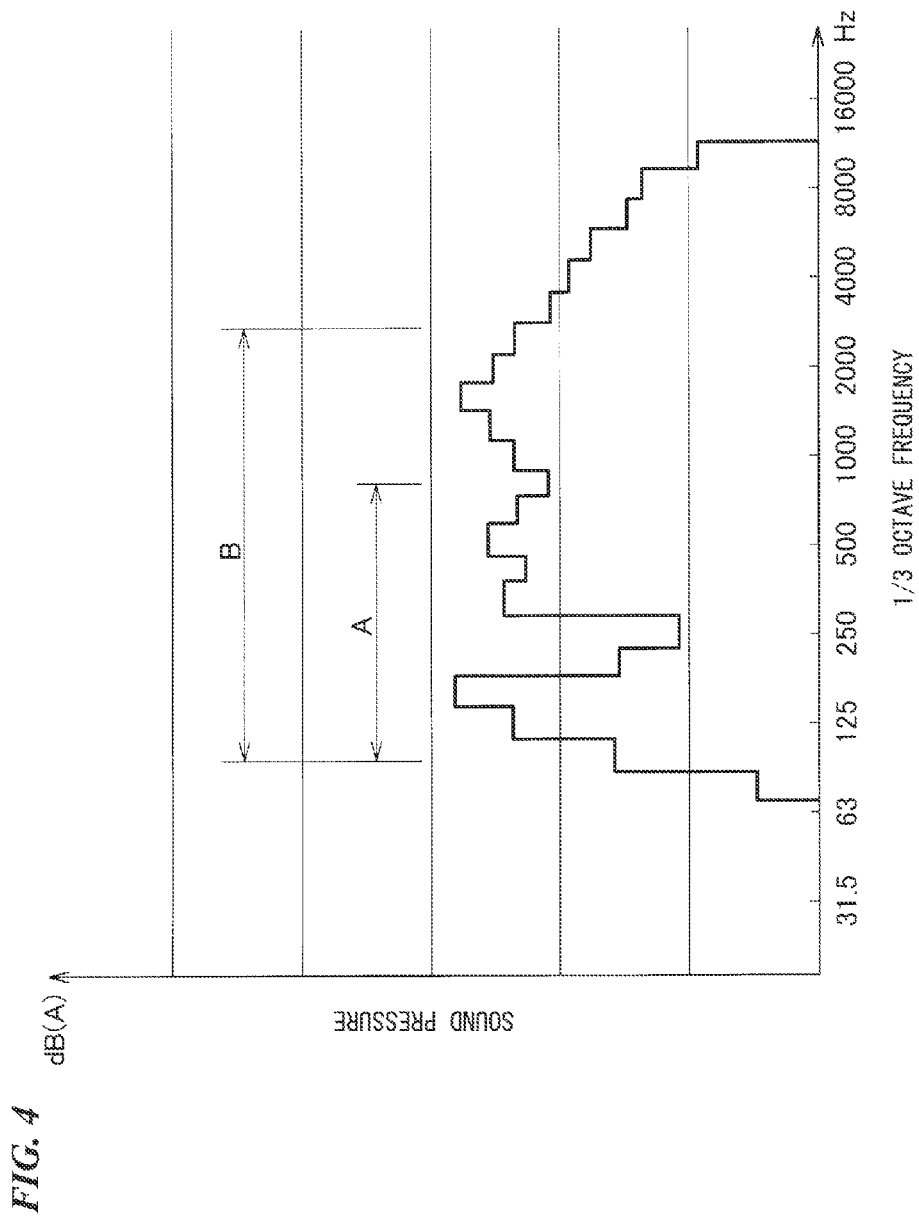
FIG. 4 is a view showing the frequency characteristics of sound during traveling of the motorcycle.

FIG. 4 expresses the frequency characteristics of sound during traveling of the motorcycle 10, the horizontal axis represents the frequency Hz of ⅓ octave, and the vertical axis represents sound pressure dB(A).

When a frequency band is investigated for every sound source of the motorcycle 10, 100 Hz to 800 Hz shown in Region A contributes greatly to the sound of an intake system and an exhaust system of the engine. Since the main frequency band of the intake or exhaust system of the internal combustion engine is 100 Hz to 800 Hz, if the generation frequency of the Helmholtz resonator 36 is 100 Hz to 800 Hz, this sound is close to the intake or exhaust sound of the engine. Thus, people can be made to recognize this sound as the intake or exhaust sound of the engine.

The operation of the Helmholtz resonator 36 described above will be described.

As shown in FIG. 5A, an air parcel 54 of the portion of the resonant tube 45 remains at the resonant tube 45 in a state where air is not blown into the resonant tube 45.

If the motorcycle 10 travels as shown in FIG. 5B, a traveling wind flows to the resonant tube 45 as per arrow (3), and the air parcel 54 of the portion of the resonant tube 45 moves toward the resonant chamber 44 as per arrow (4).

Then, since the air inside the resonant chamber 44 is compressed, the pressure within the resonant chamber 44 becomes high, and pushes out the air parcel 54 from the resonant chamber 44 side as per arrow (5) of FIG. 5C. The air parcel 54 moves to the outside as per arrow (6).

Since the traveling wind from the outside continues flowing as shown in FIG. 5D, the air parcel 54 is put back again and moves as per arrow (7). As the air parcel 54 vibrates, a specific frequency of sound is generated from the Helmholtz resonator 36.

The frequency f at this time is determined by $f = c/(2\pi) \times (S/(VL))^{1/2}$ using V (the volume of the resonant chamber 44), L (the length of the resonant tube 45), and D (the internal diameter of the resonant tube 45) in FIG. 3. In the equation, c is sound speed, and S is the opening area ($\pi \times (D/2)^2$) of the tube.

According to this relational equation, a suitable frequency can be arbitrarily set from 100 Hz to 800 Hz by selecting the volume V of the resonant chamber 44, the length L of the resonant tube 45, and the internal diameter D.

Second Embodiment

Next, a second embodiment of the invention will be described with reference to FIG. 4 and FIGS. 6 to 8. In addition, the same components as those of the first embodiment will be designated by the same reference numerals, and the detailed description thereof will be omitted.

Figure 6:
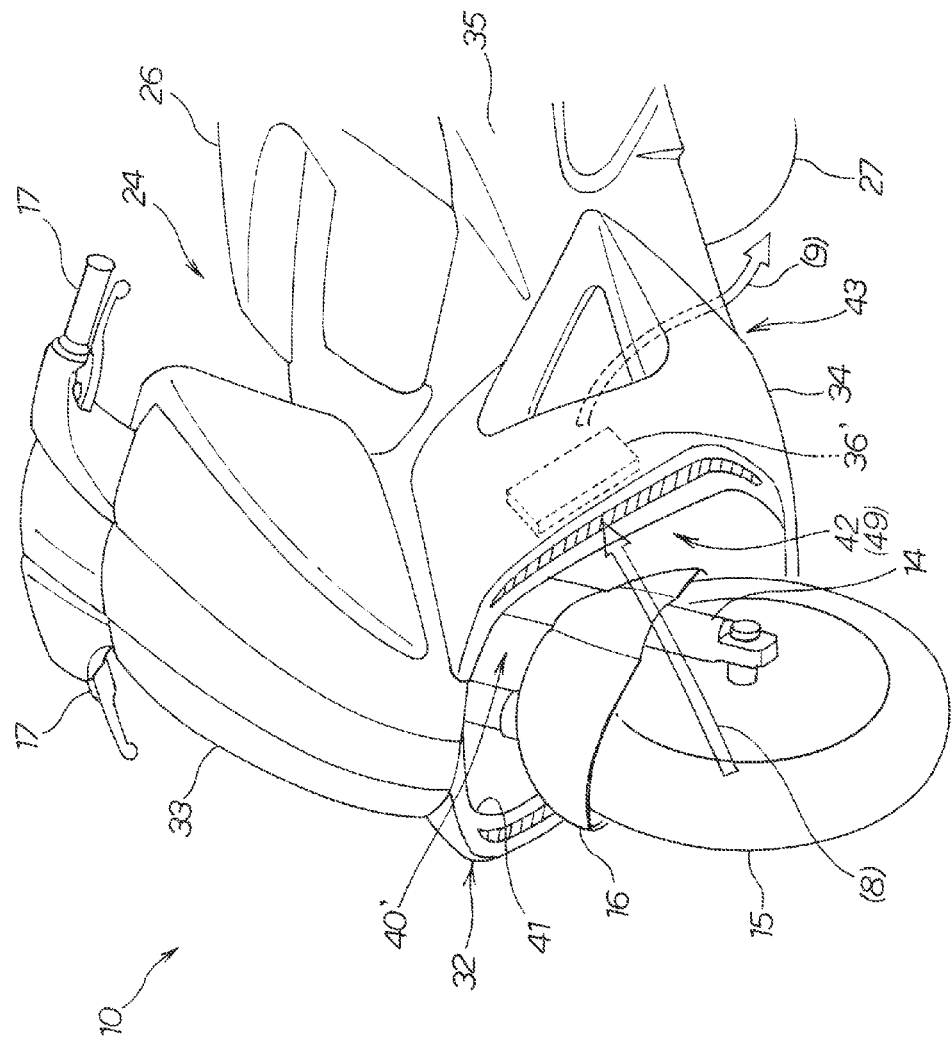
FIG. 6 is a perspective view of a motorcycle to which a vehicle approach notification device of a saddle-ridden electric-powered vehicle in a second embodiment of the invention is applied.

In a vehicle approach notification device 40' shown in FIG. 6, a harmonica 36' as a sound emission device is arranged inside the lower cover 34 (also inside the front cover 33). If the motorcycle 10 travels, air enters as per arrow (8) from the air opening 41, and air flows through the ventilation passage 42 as per arrow (9), come out from the air outlet 43 to the outside through the harmonica 36' as a sound emission device.

Next, the harmonica 36' will be described.

Figure 7:
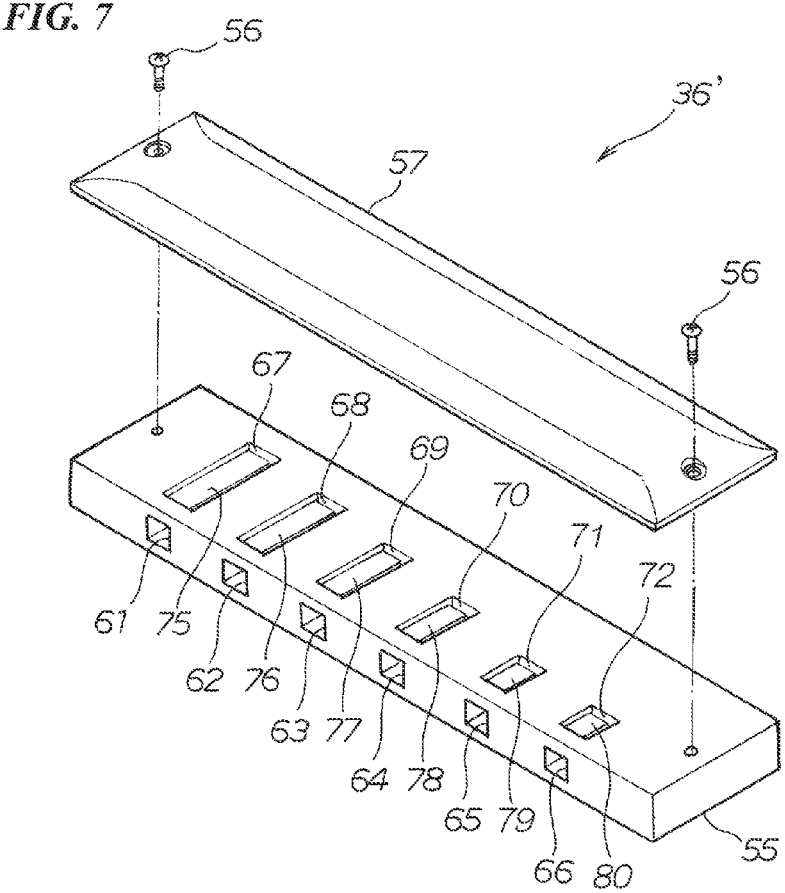
FIG. 7 is an exploded perspective view of a harmonica mounted on the vehicle approach notification device.

As shown in FIG. 7, as for the harmonica 36' as a sound emission device, a cover 57 is attached to a body 55 with bolts 56. The body 55 has a plurality of air intake ports 61 to 66 for taking in air from the outside, air escape windows 67 to 72 for allowing air to escape, and a plurality of reeds 75 to 80 each having one end attached to the back side of each of the air escape windows 67 to 72.

Between the reed 75 that emits sound with the lowest frequency and the reed 80 that emits sound with the highest frequency, the reeds 76 to 79 that emit sound with frequencies between the reeds 75 and 80 are lined up.

A frequency range of the sound that the harmonica 36' emits is set so as to be from 100 Hz to 2500 Hz.

In addition, the number of reeds is not limited to only six, and the number of reeds may be appropriately changed according to a required frequency of sound.

Referring back to FIG. 4, when a frequency band is investigated for every sound source of the motorcycle 10, 1000 Hz to 2500 Hz contributes greatly to the operation sound of the engine. Hence, since the main frequency band of the sound emitted as the overall internal combustion engine to which the aforementioned intake or exhaust system sound is applied is 100 Hz to 2500 Hz shown in Region B, this sound is close to the operation sound of the internal combustion engine of a two-wheeled vehicle if the generation frequency of the harmonica 36' as a sound emission device is 100 Hz to 2500 Hz. Thus, people are made to easily recognize this sound as the sound of the motorcycle.

The operation of the harmonica 36' described above will be described.

Figure 8:
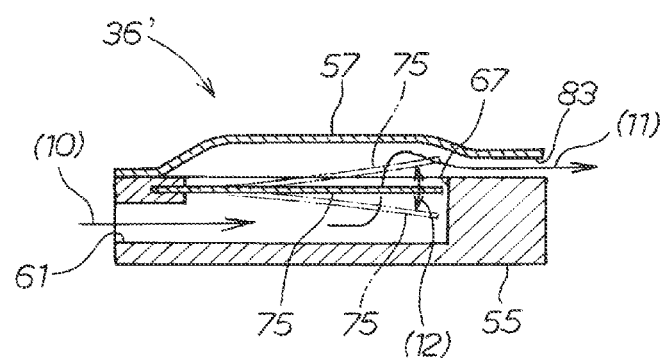
FIG. 8 is a view showing the operation of the harmonica.

If the motorcycle 10 travels as shown in FIGS. 7 and 8, a traveling wind flows into the respective air intake ports 61 to 66 as per arrow (10), and come out from an air discharge port 83 to the outside as per arrow (11) through the respective air escape windows 67 to 72. At this time, an arbitrary frequency of sound is generated from the harmonica 36' as the respective reeds 75 to 80 vibrate as per arrow (12). In addition, a plurality of the harmonicas 36' with mutually different generation frequencies may be provided.

Third Embodiment

Figure 9:
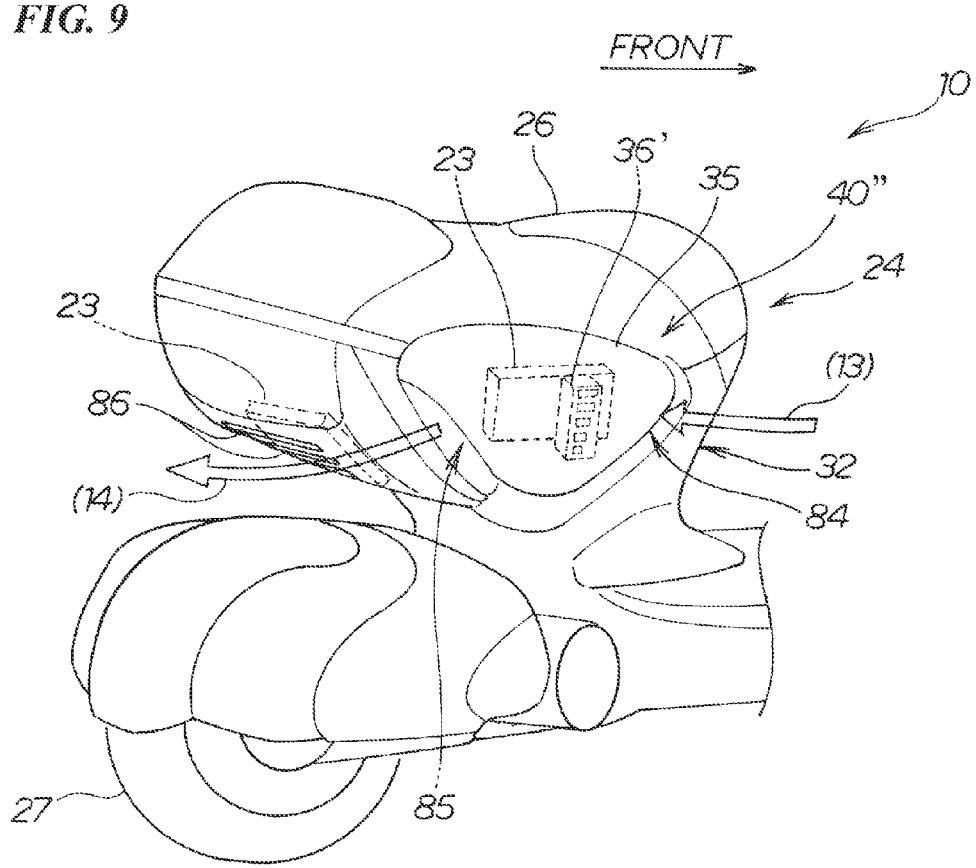
FIG. 9 is a perspective view of a motorcycle to which a vehicle approach notification device of a saddle-ridden electric-powered vehicle in a third embodiment of the invention is applied.

Next, a third embodiment of the invention will be described with reference to FIG. 9. In addition, the same components as those of the first and second embodiments will be designated by the same reference numerals, and the detailed description thereof will be omitted.

In a motorcycle 10 that adopts a vehicle approach notification device 40" shown in FIG. 9, the seat 26 is provided at the central portion of the vehicle body 24, the electric components 23 are arranged under the seat 26, and the rear wheel 27 is provided below and behind the seat 26.

The vehicle body 24 is covered with the vehicle body cover 32, and a side part of the vehicle body 24 is provided with the side cover 35.

A side air opening 84 for taking in air from the outside during traveling is provided ahead of the side cover 35, and the air that has entered as per arrow (13) from the side air opening 84 flows through a side ventilation passage 85 formed inside the side cover 35, and comes out from a rear outlet 86 to the outside as per arrow (14) while cooling the electric components 23. At this time, the harmonica 36' as a sound emission device arranged inside the side cover 35 in the vehicle approach notification device 40" emits sound.

The contents described above will be collectively described below.

As shown in FIGS. 1, 3, 6, and 9, the vehicle approach notification device 40, 40', 40" of the saddle-ridden electric-powered vehicle attached to the motorcycle 10 having the vehicle body cover 32 that covers the vehicle body 24, includes the air opening 41, 84 that is formed in the vehicle body cover 32 for taking in air from the outside, the ventilation passage 42, 85 that is formed in the vehicle body cover 32 for passing air from the air opening 41, 84 therethrough, and a sound emission device (Helmholtz resonator 36, harmonica 36') that is arranged in the ventilation passage 42, 85 and emits sound by means of an airflow that passes through the ventilation passage 42, 85.

According to this configuration, since the airflow of the ventilation passage 42, 85 formed in the vehicle body cover 32 is used, it is not necessary to separately provide an air collection tube, and compactness of the notification device can be achieved.

In addition, since the electric components for the notification device are not required, the costs of the notification device can be reduced.

Moreover, since the notification device does not consume electric power, this device can contribute to improvement in the cruising distance with one charge of the electric-powered vehicle.

Additionally, as shown in FIGS. 1, 2, 6, and 9, the sound emission device (Helmholtz resonator 36, harmonica 36') is arranged inside the vehicle body cover 32.

According to this configuration, since the sound emission device is stored in the vehicle body cover 32, the outer shape of the vehicle can be favorably maintained.

Additionally, as shown in FIGS. 1, 2, 6, and 9, the ventilation passage 42, 85 is a ventilation passage for cooling used for cooling at least one of the power engine (electric motor 31), the electric components 23, and the fuel cell 25.

According to this configuration, since the sound emission device emits sound using a cooling wind, the cooling wind can be efficiently used.

Additionally, as shown in FIGS. 1, 2, and 6, the vehicle body cover 32 is the front cover 33 that covers the front side of the vehicle body 24.

According to this configuration, since air is taken in from the opening at the front of the vehicle, a traveling wind can be efficiently taken in.

Additionally, as shown in FIGS. 1 and 2, the plurality of sound emission devices (Helmholtz resonators 36, harmonicas 36') with mutually different generation frequency are provided.

According to this configuration, by causing sound with a plurality of frequencies to be generated, the sound similar to that of an internal combustion engine can be emitted, and a pedestrian can be made to recognize the vehicle easily.

In addition, the sound that a rider can enjoy can be emitted using a chord or the like.

Figure 5:
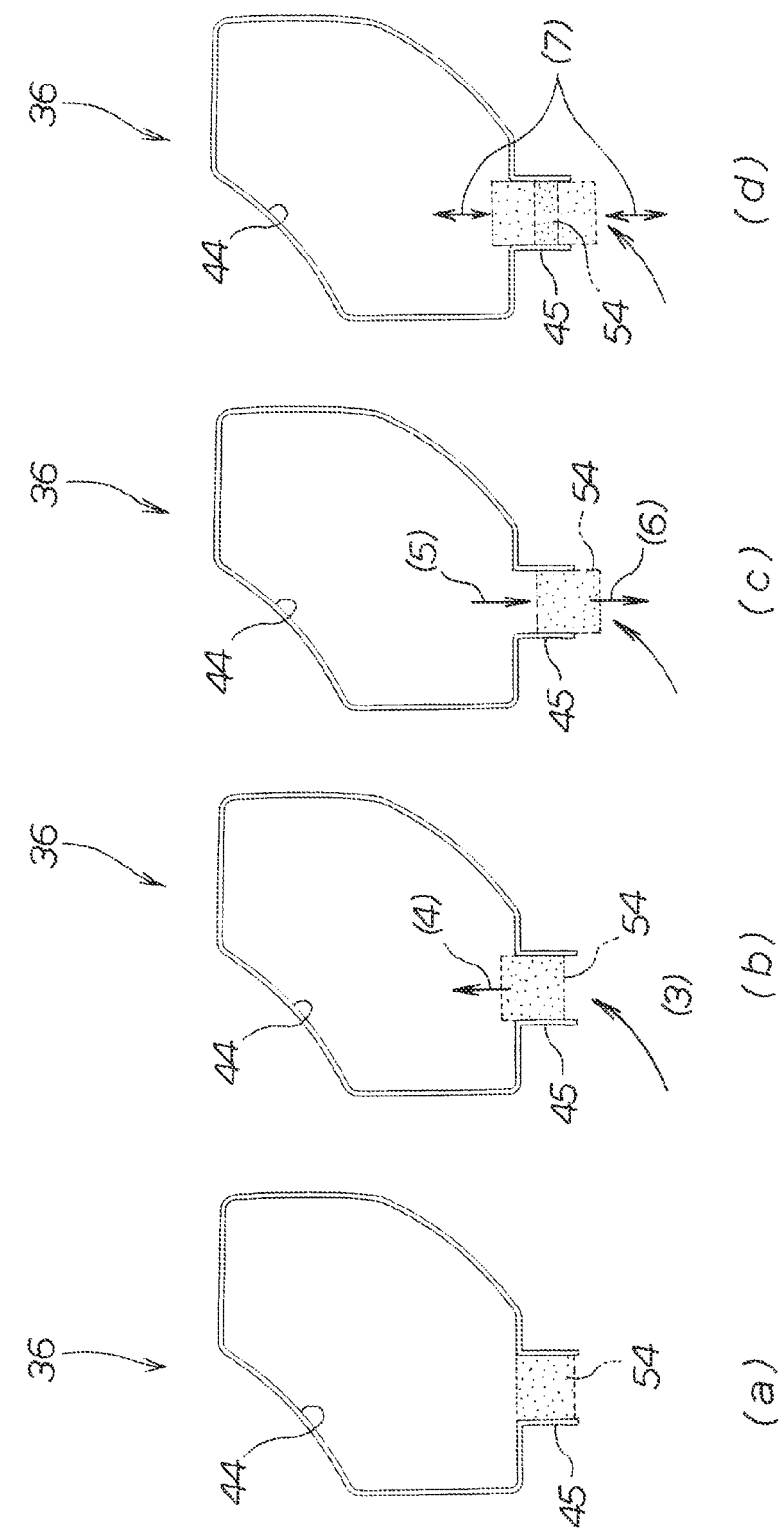
FIGS. 5A to 5D are views showing the operation of the Helmholtz resonator.

Additionally, as shown in FIGS. 3 and 5, the sound emission device is the Helmholtz resonator 36 having the resonant chamber 44 and the resonant tube 45.

According to this configuration, since sound is emitted even at low speed to medium speed flow, a structure is simple, and there is a degree of freedom in the shape of the resonant chamber 44, a shape to be arranged in a narrow space can be obtained, and the space within the vehicle body cover 32 can be effectively utilized.

In addition, since the Helmholtz resonator 36 is used, sound can be emitted with energy loss being made small.

Additionally, as shown in FIGS. 1 and 2, the resonant chamber 44 is covered with the vehicle body cover 32, and the resonant tube 45 opens into the ventilation passage 42 in the direction intersecting the ventilation passage 42.

According to this configuration, the space within the vehicle body cover 32 can be effectively utilized, and it is possible to make an arrangement that is easy to emit sound toward the ventilation passage 42.

Additionally, as shown in FIGS. 1 and 2, the resonant tube 45 extends from the resonant chamber 44, and opens downward.

According to this configuration, since the resonant tube 45 opens downward, entering of water into the resonant chamber 44 or the like can be prevented.

In addition, since water falls from the resonant tube 45 even if water enters the resonant chamber 44, it is not necessary to separately provide a drain hole, and processing costs can be reduced.

Additionally, as shown in FIGS. 3 to 5, the generation frequency of the Helmholtz resonator 36 is set from 100 Hz to 800 Hz.

According to this configuration, since the generation frequency of the intake or exhaust sound of an internal combustion engine is usually from 100 Hz to 800 Hz, if the generation frequency is from 100 Hz to 800 Hz, this sound is close to intake or exhaust sound of the internal combustion engine.

Thus, people can be made to easily recognize this sound. Additionally, there can be sound with relatively no jarring even for a rider.

Additionally, as shown in FIGS. 6 to 8, the sound emission device is the harmonica 36' that a plurality of reeds 75 to 80 is vibrated by means of an airflow to emit sound.

According to this configuration, since it is easy to emit sound even using a minute airflow if the sound emission device is the harmonica 36', sound can be emitted even if the vehicle speed is slow.

In addition, since a plurality of different reeds 75 to 80 is provided, sound with a plurality of frequencies can be emitted.

Additionally, as shown in FIGS. 4, and 7 to 9, the frequency range of the harmonica 36' is from 100 Hz to 2500 Hz.

According to this configuration, usually, as for the generation frequency of the internal combustion engine, the contribution from 100 Hz to 2500 Hz is large, and a frequency range that is higher than 2500 Hz may be sensed as a jarring sound for people. Therefore, a pedestrian or a rider can be made to appropriately recognize sound with the frequency band of the sound of the internal combustion engine by adopting a range of 100 Hz to 2500 Hz.

In addition, although the first embodiment has shown an example of application to a fuel cell vehicle, the invention is not limited only to this, and may be applied to a saddle-ridden electric-powered vehicle (also including three-wheeled vehicles (also including front two-wheeled and rear one-wheeled vehicles in addition to front one-wheeled and rear two-wheeled vehicles) or four-wheeled vehicles in addition to the two-wheeled vehicle) including an electric motor as a power engine, such as hybrid vehicles and electric-powered vehicles that travel using accumulated electric power to a battery. That is, if the sound emission device that emits sound by a traveling wind is provided, the invention may be applied to other electric-powered vehicles.

Additionally, the vehicle approach notification devices related to the respective embodiments may be mutually complemented by an electrical simulation sound. In this case, the simulation sound before and after starting of a vehicle may be made to be electrically generated and the sound emission device related to the present embodiment may be made to generate sound during traveling. This can reduce power consumption.

Additionally, a plurality of frequencies of the sound emitted from the plurality of Helmholtz resonators 36 or harmonicas 36' may be a chord, or may be so-called a dissonant sound with fluctuation. This enables a frequency configuration which is easily audible for people to be selected.

Additionally, one sound may be the sound from 100 Hz to 800 Hz that is the sound range of an intake or exhaust system, and the other sound may be combined with 100 Hz to 2500 Hz that is the sound range of an engine.

Fourth Embodiment

Next, a fourth embodiment of the invention will be described with reference to FIGS. 10 to 13.

Figure 10:
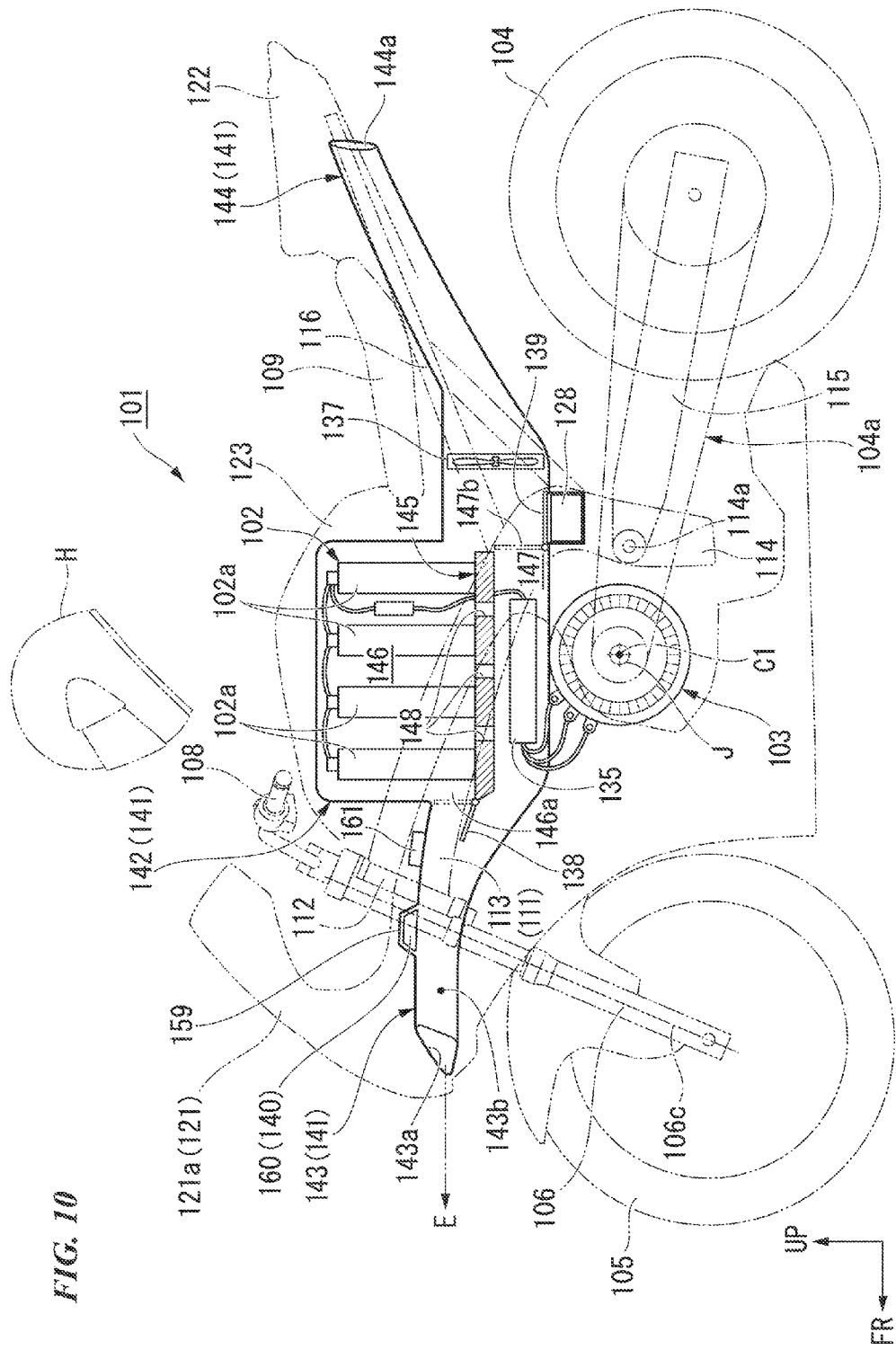
FIG. 10 is a left side view of a motorcycle to which a vehicle approach notification device of a saddle-ridden electric-powered vehicle in a fourth embodiment of the invention is applied.

A motorcycle 101 shown in FIG. 10 mounts a main battery 102 for traveling at a central upper portion of a vehicle body, mounts a motor unit 103 for traveling (electric motor) at a central lower portion of the vehicle body, drives the motor unit 103 with the electric power from the main battery 102, and transmits the driving force to a rear wheel 104 that is a driving wheel, thereby performing traveling. In addition, arrow FR in the drawing indicates the vehicle front, and arrow UP indicates the vehicle upper side.

The motorcycle 101 has an aspect as a sports motorcycle in which a rider is able to perform knee gripping, the front wheel 105 is pivotally supported to a lower end of a pair of right and left front forks 106, and upper portions of the right and left front forks 106 is steerably pivoted on the head pipe 112 at the front end of the vehicle body frame 111 via a steering stem (not shown). A steering handle 108 for is attached to the upper portion of the steering stem (or front forks 106). In addition, reference numeral 106c in the drawing designates the central axis of the front forks 106.

A pair of right and left main frames 113 extends rearward and downward from the head pipe 112, and pivot frames 114 extends downward from rear ends of the right and left main frames 113, respectively. Front ends of swing arms 115 are pivoted on the right and left pivot frames 114 via a pivot shaft 114a so as to be swingable up and down, and the rear wheel 104 is pivotally supported to rear ends of the swing arms 115.

A vehicle body front portion of the motorcycle 101 is covered with cowling 121 from the front, the side, and the bottom. Hereinafter, a region (a region that faces the vehicle front and a region that is joined to the region from the rear) in the cowling 121 that covers the periphery of the head pipe 112 is referred to as a front cover 121a.

A seat frame 116 extends rearward and upward from the rear ends of the right and left main frames 113 and the right and left pivot frames 114. A seat 109 on which a rider is seated is supported on the seat frame 116. The periphery of the seat frame 116 is covered with seat cowl 122. The vehicle body frame 111 including the seat frame 116 is formed by integrally combining two or more kinds of metal members by welding, fastening, or the like. A seat frame front cover 123 that swells upward more than the upper edges of the right and left main frames 113 is arranged ahead of the seat 109. The seat frame front cover 123 is interposed between both knees of a rider who sits down on the seat 109.

The main battery 102 includes, for example, a plurality of (four in the drawing) single batteries 102a that is aligned back and forth, and generates a predetermined high voltage (48 to 72 V) by connecting these batteries in series. Each single battery 102a is an appropriately chargeable and dischargeable energy storage, for example, includes a lithium ion battery, a nickel-hydrogen battery, a lead battery, or the like.

The main battery 102 is fixedly supported by the vehicle body frame 111 via a duct 141 in a state to that the front lower side has entered between the right and left main frames 113.

The motor unit 103 is located immediately below the main battery 102, and the motor unit 103 is fixedly supported by the vehicle body frame 111. The motor unit 103 has a rotation axis C1 along a right-and-left direction, and a drive shaft J of the motor unit 103 and the rear wheel 104 are coordinated only via, for example, a chain type transmission mechanism 104a. In addition, the transmission mechanism 104a may be of a belt type or a shaft type.

Although the motor unit 103 is driven in a speed adjustable manner that VVVF (variable voltage variable frequency) control is made, for example and drives the rear wheel 104 only via the transmission mechanism 104a, the motor unit may be adapted to drive the rear wheel 104 manually, via an automatic transmission, or a clutch. Additionally, reference numeral 135 in the drawing designates a control unit including an ECU (electric control unit) and a PDU (power driver unit) that is a motor driver.

The duct 141 is provided to extend over front and rear ends of the vehicle body, allows external air to be circulated along the longitudinal direction, and integrally has an electric component accommodating portion 142 that is formed so that a channel is widened at a front-rear intermediate portion, an intake duct 143 that extends forward from a front end lower portion of the electric component accommodating portion 142, and an exhaust air duct 144 extended rearward from a rear end lower portion of the electric component accommodating portion 142.

The electric component accommodating portion 142 is located between the right and left main frames 113 above the motor unit 103, and an upper portion thereof is made to enter the seat frame front cover 123. In the electric component accommodating portion 142, a substantially horizontal plate-shaped partition wall 145 is anchored to the bottom inner side of the accommodating portion, the space above the partition wall 145 is used as a battery accommodating portion 146 that accommodates the main battery 102, and the space below the partition wall 145 is used as a driver accommodating portion 147 that accommodates the control unit 135.

As for the duct 141, a duct forming portion thereof is constituted by, for example, a resin molded article, whereas the partition wall 145 is constituted by members with relatively high heat conductivity, such as an aluminum alloy. The partition wall 145 is also a heat sink of the main battery 102, and the main battery 102 is directly placed on the partition wall 145. The partition wall 145 is formed with a plurality of communication holes 148 that allow the accommodating portions 146 and 147 to communicate with each other. The opening area of the communication holes 148 is made sufficiently smaller than the channel area of each of the accommodating portions 146 and 147.

The front end of the partition wall 145 is provided with a front louver 138 that opens and closes an upper intake inlet 146a at the front end of the battery accommodating portion 146. On the other hand, the rear end of the lower wall of the electric component accommodating portion 142 is provided with a rear louver 139 that opens and closes a lower exhaust outlet 147b at the rear end of the driver accommodating portion 147. The respective louvers 138 and 139 are electric-powered, and the operation thereof is controlled by the control unit 135 on the basis of the temperature information or the like of the main battery 102.

The intake duct 143 extends forward inside the cowling 121 (front cover 121a), and a front end opening (intake port 143a) thereof is made to open toward the vehicle front (outside the cowling) at the front end and cowling 121 and ahead of the head pipe 112. The intake port 143a functions as a traveling wind introduction port during vehicle traveling. In addition, reference numeral 143b in the drawing designates a ventilation passage within the intake duct 143.

The intake duct 143 branches to the right and left so as to avoid the vehicle body frame 111 (head pipe 112) or the like, or extends forward so as to be biased to one of the right and left. The intake duct 143 intersects the front forks 106 and the head pipe 112 in a vehicle side view (crosses the front forks 106 and the head pipe 112).

The exhaust air duct 144 extends rearward inside the seat cowl 122, and a rear end opening (exhaust port 144a) thereof is made to open toward the vehicle rear at the rear end of the seat cowl 122. A fan 137 that forcibly circulates the air within the duct 141 from the intake port 143a side to the exhaust port 144a side is provided inside, for example, a base end (front end) of the exhaust air duct 144.

The respective louvers 138 and 139 close the upper intake inlet 146a and close the lower exhaust outlet 147b at a low temperature of the main battery 102 (in the case of less than a predetermined temperature suitable for charging and discharging of the main battery 102). Thereby, the external air that is taken into the duct 141 first flows only into the driver accommodating portion 147, and takes the heat of the control unit 135 while cooling this control unit. Then, the external air flows into the battery accommodating portion 146 through the respective communication holes 148, warms the respective single batteries 102a while flowing to the peripheries of the batteries, and is then exhausted out of the duct 141.

On the other hand, the respective louvers 138 and 139 open the upper intake inlet 146a and opens the lower exhaust outlet 147b at a high temperature of the main battery 102 (in the case of higher than or equal to a predetermined temperature). Thereby, the external air that is taken into the duct 141 flows into the battery accommodating portion 146 and the driver accommodating portion 147, respectively, cools the main battery 102 and the control unit 135, respectively, and then is exhausted out of the duct 141. When the rear louver 139 opens the lower exhaust outlet 147b, an upper opening of a recess that accommodates a sub-battery 128 of 12 V is blocked.

Here, the motorcycle 101 includes the vehicle approach notification device 140 that outputs a predetermined notification sound from the sound emission device attached to a host vehicle, thereby informing a pedestrian or the like of approach of the host vehicle. In the present embodiment, a speaker 160 that is a sound emission device that emits a notification sound is arranged further inside the intake duct 143 within the front cover 121a.

In detail, a swelling portion 159 that swells upward is formed at an upper wall portion of the front-rear intermediate portion of the intake duct 143 (a region that partially overlaps the front forks 106 in a vehicle side view and is located ahead of the axis 106c of the front forks 106), and the speaker 160 is stored within the swelling portion 159. The swelling portion 159 is opened toward the inside (ventilation passage 143b) of the intake duct 143 therebelow. The sound releasing direction of the speaker 160 within the swelling portion 159 faces the lower side (the inside of the intake duct 143, the ventilation passage 143b).

Thereby, the emitted sound of the speaker 160 is released to the vehicle front through the intake duct 143 and the ventilation passage 143b. At this time, the intake duct 143 functions as a propagation member of the emitted sound of the speaker 160, and functions also as a sound guide duct of the emitted sound of the speaker 160. In addition, the number of installation of speakers is not limited. The sound releasing direction (indicated by arrow E) of the notification sound of the speaker 160 from the intake port 143a faces the traveling direction of the motorcycle 101, and is easily recognized by a pedestrian or the like. On the other hand, since the sound releasing direction faces a direction away from a rider's head H, audibility to the rider is suppressed.

The control unit 161 for the speaker 160 is attached to an upper wall portion of a rear portion (a region behind the head pipe 112 in side view) of the intake duct 143. In addition, the configuration and performed control of the control unit 161 are made to be the same as that of a control unit 260 in a fifth embodiment to be described below.

Figure 11:
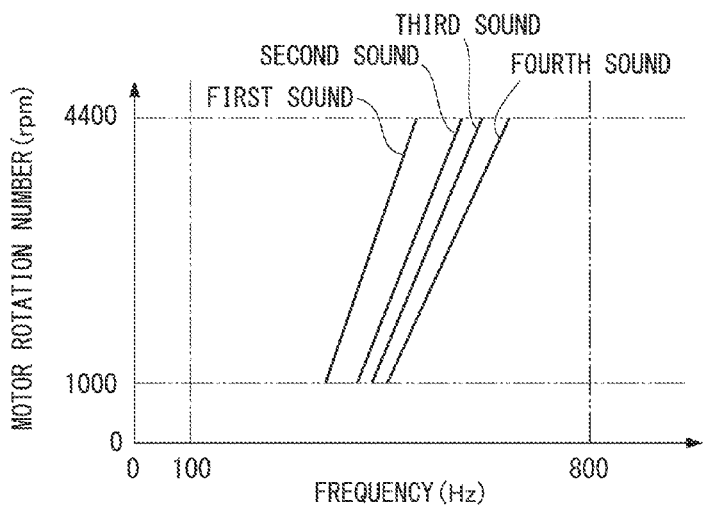
FIG. 11 is a graph showing the relationship between the frequency of a notification sound and the rotation number of a motor unit in the motorcycle of FIG. 10.

FIG. 11 is a graph showing the relationship between the rotation number rpm of the motor unit 103 and the frequency Hz of the notification sound of the speaker 160 in a case where a centrifugal clutch (not shown) is provided on a transmission path from the motor unit 103 to the rear wheel 104.

In the present embodiment, the notification sound is output as a synthetic tone (including a consonant sound and a dissonant sound) of four frequencies. In detail, the notification sound has a first sound that becomes a reference sound, a second sound that has a frequency of 1.18 times the frequency of the reference sound, a second sound that has a frequency of 1.23 times the frequency of the reference sound, and a fourth sound that has a frequency of 1.33 times the frequency of the reference sound. As for respective sounds, the first sound is output in a ratio of 30% of the total, the second sound in output in a ratio of 25% of the total, the third sound is output in a ratio of 25% of the total, and the fourth sound is output in a ratio of 5% of the total. In addition, a noise sound occupies the remaining 15%.

In FIG. 11, the inclination of the first sound is 48 Hz/1000 rpm, and has an intercept of 288 Hz at 1000 rpm.

That is, the frequency of the first sound at 1000 rpm is obtained from the following Equation (1).

$$1000 \times 48/1000 + 288 = 336 \text{ (Hz)} \tag{1}$$

At this time, the frequency of the second sound becomes 396 Hz, the frequency of the third sound becomes 413 Hz, and the frequency of the fourth sound becomes 447 Hz, and a synthetic tone including these respective sounds is output from the speaker 160. The reason why the synthetic tone is used as the notification sound is that the synthetic tone is easily transmitted to and heard by the surroundings compared with a single tone of only a specific frequency. In addition, a notification sound of a single tone may be output.

The notification sound is output when the rotation number of the motor unit 103 within a range of 1000 to 4400 rpm. 1000 rpm of the motor unit 103 is equivalent to the connection rotation number of the centrifugal clutch, that is, the starting rotation number of the vehicle, and 4400 rpm is equivalent to the rotation number that becomes a vehicle speed that does not require the notification sound.

The notification sound shifts to a high frequency in proportion to a rise in the motor rotation number. This is to make the circumstances of the acceleration and deceleration of the vehicle comprehensible.

Additionally, by making the rise ratio of the notification sound frequency smaller than the rise ratio of the motor rotation number, the fluctuation range of the frequency of the notification sound is suppressed and even the highest frequency becomes smaller than a specific frequency (800 Hz). This enables sound to be easily heard irrespective of age or the like, and enables the notification sound to be set to a favorite sound range. In addition, the lowest frequency of the notification sound is desirably larger than 100 Hz when audibility is taken into consideration.

Here, if the ratio of the frequency of the second sound to the frequency of the first sound (reference sound) is a2, and the ratio of the frequency of the third sound to the frequency of the first sound is a3, the ratio of the frequency of the fourth sound to the frequency of the first sound is a4, these have the relationship shown in the following Equation (2).

$$a2-1 > a3-a2 \tag{2}$$

In addition, by setting the "a3−a2" to be less than or equal to 0.05, it can be seen than a fluctuation or a surge is given to the notification sound, thereby producing a favorite sound.

Figure 12:
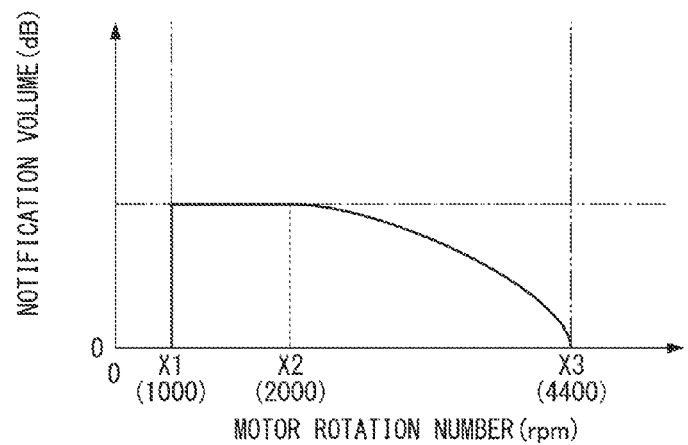
FIG. 12 is a graph showing the relationship between the volume of the notification sound and the rotation number of the motor unit in the motorcycle of FIG. 10.

As shown in FIG. 12, although the notification sound is output at a fixed sound volume from a vehicle starting rotation number X1 (1000 rpm in the present embodiment), the notification sound is set so that the volume begins to decrease parabolically from a halfway intermediate rotation number X2 (2000 rpm in the present embodiment), and output stops at a sound stop rotation number X3 (4400 rpm in the present embodiment).

Figure 13:
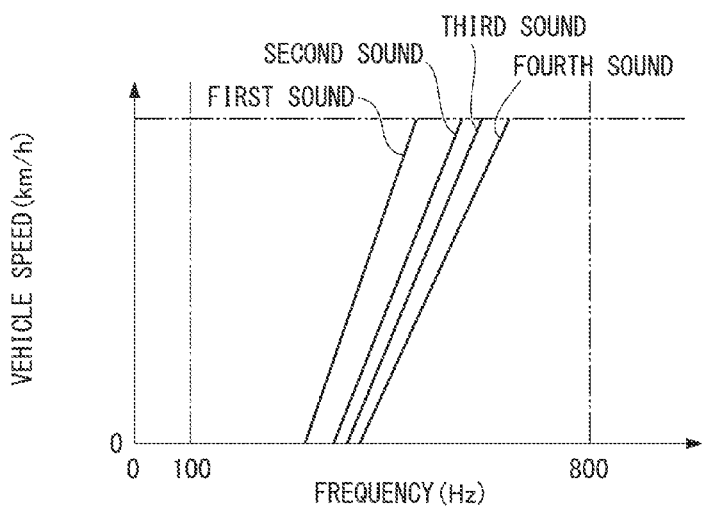
FIG. 13 is a graph showing the relationship between the frequency of the notification sound and a vehicle speed as a modification of the control shown in FIG. 11.

In addition, as shown in FIG. 13, instead of the rotation number of the motor unit 103, the frequency or the like of the notification sound may be controlled according to changes in the vehicle speed. In this case, the notification sound may be emitted, for example when the rotation of a vehicle wheel is detected from a vehicle stop state (the vehicle speed is 0 km/h).

As described above, the vehicle approach notification device 140 of the saddle-ridden electric-powered vehicle in the above embodiment is adapted to output a notification sound for notifying approach of the vehicle from the speaker 160, which is attached to the vehicle body of the motorcycle 101 having the motor unit 103 as a power engine, to the surroundings. The motorcycle 101 includes the front cover 121a that covers the periphery of the head pipe 112 of the vehicle body frame 111, the speaker 160 is located inside the front cover 121a, the front cover 121a has the intake port 143a for taking in air from the outside, and the ventilation passage 143b that is a passage of air from the intake port 143a and is used for cooling at least one of the power engine (motor unit 103) of the motorcycle 101 and the electric components (the main battery 102 and the control unit 135), and the speaker 160 is arranged in the ventilation passage 143b.

According to this configuration, since the speaker 160 is stored within the front cover 121a, the outer shape of the vehicle can be favorably maintained and the speaker 160 can be protected by the front cover 121a. Additionally, since the sound that the sound emission device emits can be propagated, efficiently using the directivity possessed by the ventilation passage 143b formed within the front cover 121a, and opening to the outside of the cover, sound emission energy can be made relatively small, and this notification device can be made compact. Moreover, audibility to a rider can be reduced by emitting sound through the ventilation passage 143b that opens to the outside of the cover. Moreover, since the sound that the speaker 160 emits is propagated using the ventilation passage 143b for cooling of the apparatus, the number of parts can be reduced as compared to a case where a sound propagation member is separately provided.

Here, the ventilation passage 143b may cool the motor unit 103 other than the main battery 102 or the control unit 135, for example, by supplying a cooling wind to the motor unit 103. In other words, the ventilation passage 143b may cool at least one of the main battery 102, the control unit 135, and the motor unit 103.

Additionally, in the vehicle approach notification device 140, the speaker 160 is arranged at the upper portion of the ventilation passage 143b to emit sound into the ventilation passage 143b.

According to this configuration, sound can be efficiently released to the outside of the vehicle using the ventilation passage 143b, and the water or the like that has entered the ventilation passage 143b can be suppressed from falling on the speaker 160.

Additionally, in the vehicle approach notification device 140, the ventilation passage 143b is formed by the duct 143 that extends from a position ahead of the head pipe 112 within the front cover 121a, and the speaker 160 is arranged at the upper wall portion of the duct 143 to emit sound into the ventilation passage 143b.

According to this configuration, since the sound that the sound emission device emits can be more efficiently propagated by the duct and the directivity of the sound to the outside of the vehicle is further raised, audibility to a rider can be further reduced.

Additionally, in the vehicle approach notification device 140, the intake duct 143 is a wind guide duct that crosses the side of the head pipe 112, and opens toward the vehicle front.

According to this configuration, sound can be efficiently propagated to the vehicle front using the wind guide duct for taking in cooling air from the vehicle front. Additionally, audibility of the notification sound to a rider can be further reduced by releasing sound to the outside of the vehicle from the opening that is spaced from the position of rider's ears and faces the direction opposite to the position of the ears.

Additionally, in the vehicle approach notification device 140, the upper portions of the front forks 106 that extends obliquely forward and downward is steerably supported by the head pipe 112 in order to suspend the front wheel 105, and the speaker 160 is arranged ahead of the axis 106c of the front forks 106.

According to this configuration, by arranging the speaker 160 ahead of the axis 106c of the front forks 106 below the head pipe 112, the speaker 160 can be efficiently arranged at a position distanced from the position of rider's ears, and audibility of the notification sound to a rider can be further reduced. In addition, his configuration also includes a case where a portion of speaker 160 is arranged ahead of the axis 106c of the front forks 106.

Additionally, in the vehicle approach notification device 140, the intake duct 143 is a cooling duct that cools the main battery 102.

According to this configuration, an increase in the number of parts can be suppressed while enabling sound to be efficiently propagated, by using the cooling duct of the main battery 102 as a propagation member of sound.

Additionally, in the vehicle approach notification device 140, the sound emission frequency of the speaker 160 is set from 100 Hz to 800 HZ.

According to this configuration, the notification sound can be emitted using a sound range that is easy to hear.

Fifth Embodiment

Next, a fifth embodiment of the invention will be described with reference to FIGS. 14 to 17.

Figure 14:
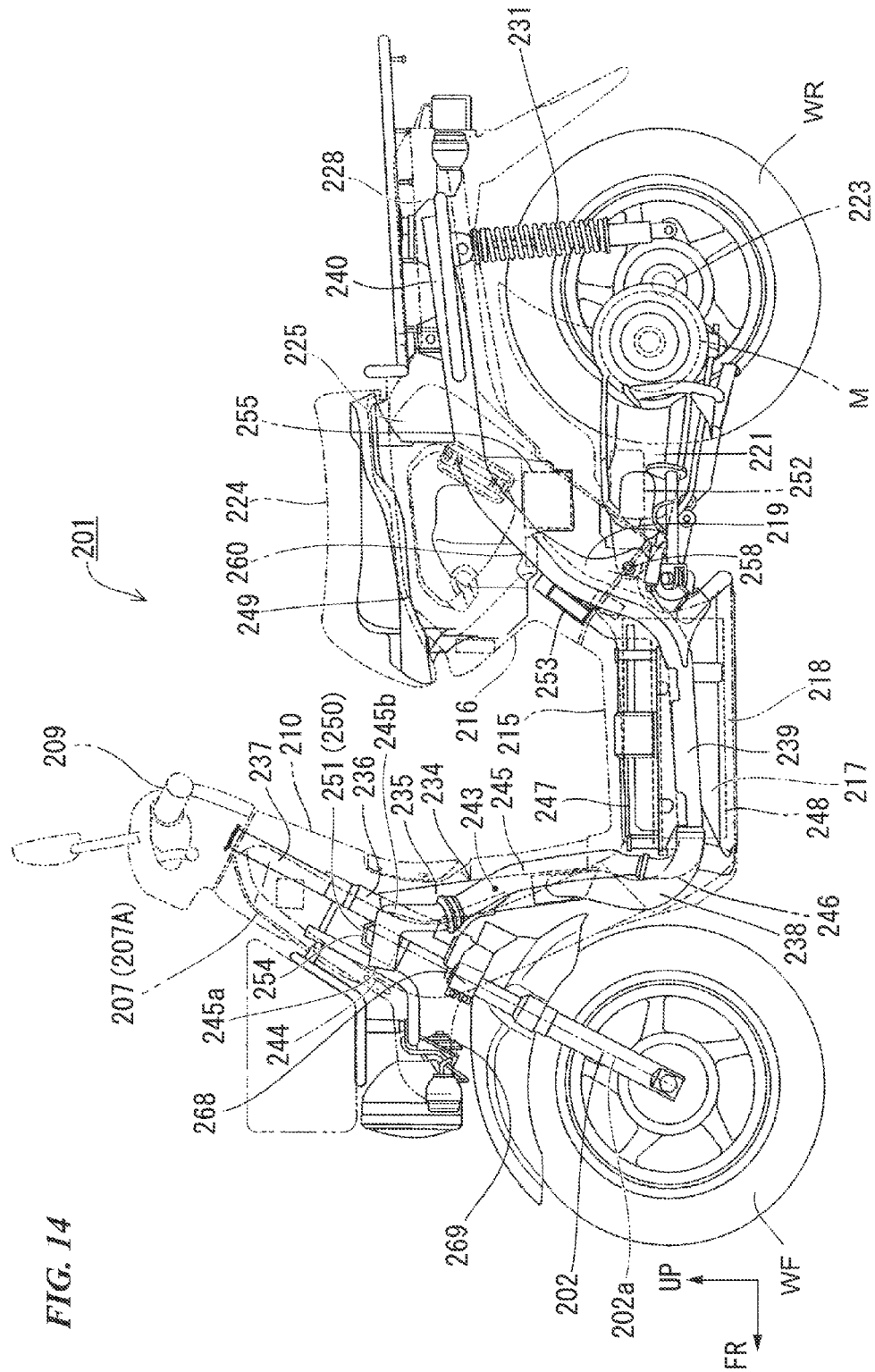
FIG. 14 is a left side view of a motorcycle to which a vehicle approach notification device of a saddle-ridden electric-powered vehicle in a fifth embodiment of the invention is applied.

A motorcycle 201 shown in FIG. 14 is a scooter type saddle-ridden electric-powered vehicle having a low floor 215, and the rear wheel WR pivotally supported to an axle 223 is rotationally driven and the vehicle travels by the rotative power exerted by an electric motor M that is built within a swing arm 221. In addition, arrow FR in the drawing indicates the vehicle front, and arrow UP indicates the vehicle upper side.

A vehicle body frame 234 of the motorcycle 201 includes a head pipe 236 that inclines so that an upper portion thereof is located on the rear side, a main frame 235 that extends rearward and downward from the head pipe 236, a pair of right and left underframes 239 that is coupled to a lower portion of this main frame 235 via a curved portion 238 and extends rearward, and a pair of right and left rear frames 240 that is integrally continuous with rear ends of the respective underframes 239, respectively, and extends rearward and upward.

The head pipe 236 rotatably journals a steering stem 237, and a steering handle 209 is fixed to an upper end of the steering stem 237. On the other hand, an under-bracket 268 that supports upper ends of a pair of right and left front forks 202 is fixed to a lower end of the steering stem 237. A front wheel WF is pivotally supported to lower ends of the respective front forks 202. In addition, reference numeral 202a in the drawing designates the central axis of the front forks 202.

A pair of right and left pivot plates 219 is respectively provided at front portions of the respective rear frames 240 of the vehicle body frame 234. A front portion of the swing arm 221 is supported on the respective pivot plates 219 to swing freely via a pivot shaft 258. The swing arm 221 is of a cantilever type that journals the rear wheel WR only with a left arm in the vehicle width direction. A rear cushion unit 231 is provided between a rear portion of the left rear frame 240, and a rear portion of the swing arm 221. A centrifugal clutch as a connection and disconnection mechanism of a rotational driving force and a deceleration mechanism (neither are shown) and a PDU (power drive unit) 252 that controls the output of the electric motor M, in addition to the electric motor M are intensively arranged within the swing arm 221.

The motorcycle 201 includes a front cover body 207 that covers the periphery of the head pipe 236 from the front, a leg shield 210 that covers the periphery of the head pipe 236 from the rear, a low floor 215 that is liked with the lower rear side of leg shield 210 and covers a battery case 247 from above so that the leg of a rider who sits on the seat 224 is placed thereon, a pair of right and left floor side covers 217 that hangs from the outside of the low floor 215 so as to cover the outer lateral sides of the respective underframes 239, an undercover 218 provided so as to connect lower edges of the respective floor side covers 217, a seat front lower cover 216 that rises up from a rear end of the low floor 215 so as to cover the space below the seat 224 from the front, a pair of right and left side covers 225 that is linked with the outer rear sides of the seat front lower cover 216 so as to cover the space lower the seat 224 from both sides, and a rear cover 228 that is linked with the respective side covers 225 so as to cover the rear wheel WR from above.

The front cover body 207 that faces the front of the vehicle body and the leg shield 210 that is joined to the front cover body from the rear are integrally mutually combined, and constitute a front cover 207A that covers the vehicle body front portion including the periphery of the head pipe 236. A horn 269 that emits an alert is disposed inside the front cover 207A.

The battery case 247 stores a high-voltage battery 248 of, for example, 72 V for supplying electric power to the electric motor M.

Downstream ends of a pair of right and left of cooling air introduction ducts 245 are connected to a front portion of the battery case 247 via a connecting pipe 246. Each cooling air introduction duct 245 is curved forward after extending upward along the main frame 235 so as to sandwich the main frame 235 from the outer lateral side within the front cover 207A, and a tip opening (intake port 245a) thereof is made to open to the front within the front cover 207A ahead of the head pipe 236. In addition, reference numeral 243 in the drawing designates a ventilation passage formed within the cooling air introduction duct 245.

An external air introduction port 244 is formed in the front cover body 207 so that face the intake port 245a, and external air (traveling wind) is introduced into the cooling air introduction duct 245 through the external air introduction port 244.

A cooling fan 253 is attached to a rear upper face of the battery case 247, and air sucked from the cooling air introduction duct 245 is introduced into the battery case 247 by the operation of the cooling fan 253, and cools the high-voltage battery 248 within the battery case 247.

Here, the motorcycle 201 includes the vehicle approach notification device 250 that outputs a predetermined notification sound from the sound emission device attached to a host vehicle, thereby informing a pedestrian or the like of approach of the host vehicle. In the present embodiment, a speaker 251 that is a sound emission device that emits a notification sound is arranged further inside the cooling air introduction duct 245 within the front cover 207a.

In detail, a swelling portion 254 that swells upward is formed at an upper wall portion of the upper bent portion 245b of the cooling air introduction duct 245, and the speaker 251 is stored within the swelling portion 254. The swelling portion 254 is opened toward the inside (ventilation passage 243) of the cooling air introduction duct 245 therebelow. The sound releasing direction of the speaker 251 within the swelling portion 254 faces the lower side (the inside of cooling air introduction duct 245, the ventilation passage 243).

Thereby, the emitted sound of the speaker 251 is released to the vehicle front through the cooling air introduction duct 245, the ventilation passage 243, and the external air introduction port 244. At this time, the cooling air introduction duct 245 functions as a propagation member of the emitted sound of the speaker 251, and functions also as a sound guide duct of the emitted sound of the speaker 251. In addition, the number of installation of the speakers 251 is not limited.

A goods storage box 249 that can be opened and closed by the seat 224 is arranged below the seat 224, and a low-voltage battery 255 of 12 V and a control unit 260 for the speaker 251 are arranged at the bottom of the goods storage box 249.

Figure 15:
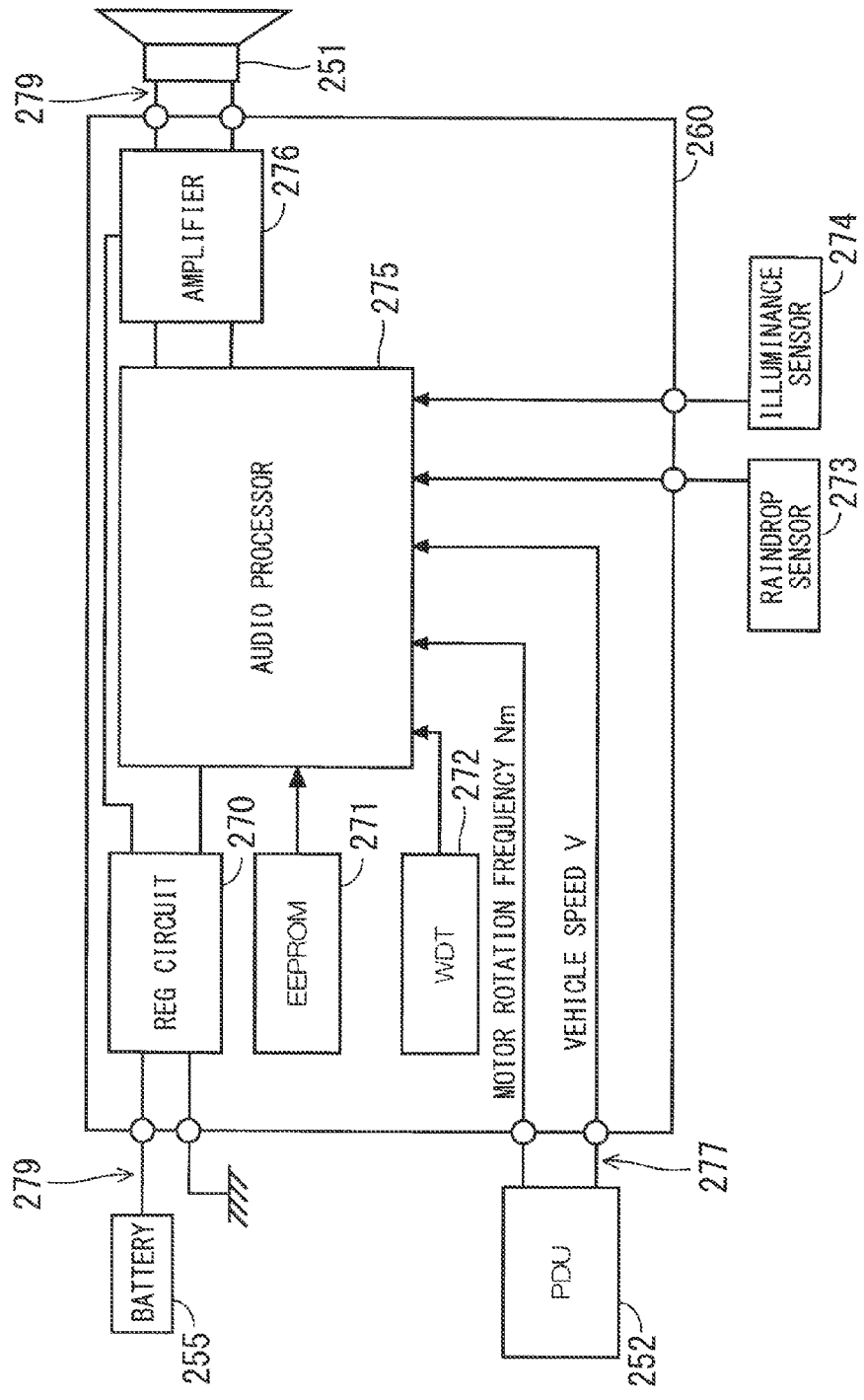
FIG. 15 is a block diagram showing the configuration of a control unit in the motorcycle of FIG. 14.

FIG. 15 is a block diagram showing the configuration of the control unit 260. The control unit 260 includes an REG (regulator) circuit 270, an EEPROM 271 as pseudo-engine volume memory device in which a sound source and volume, such as engine sound of an internal combustion engine vehicle, are recorded, a WDT (watchdog timer) 272 for holding normal operation of a system, an audio processor 275, and an amplifier 276.

Information from the PDU 252 is input to the control unit 260 via a first coupler 277. Additionally, the low-voltage battery 255 is connected to the REG circuit 270 of the control unit 260 via a two-pin type second coupler 279. Moreover, the speaker 251 is connected to the amplifier 276 of the control unit 260 via the second coupler 279. The output information of the EEPROM 271 and the WDT 272 and motor rotation number Nm and vehicle speed V that are input from the PDU 252 are input to an audio processor 275.

The audio processor 275 calls out a predetermined sound source from the EEPROM 271 on the basis of information on the motor rotation number Nm and the vehicle speed V, and outputs a notification sound from the speaker 251 at a predetermined sound volume via the amplifier 276.

In addition, although an input portion from the low-voltage battery 255 and an output portion from the amplifier 276 are shown in a separated manner in the drawing, both of these portions are integrated at the four-pin type second coupler 279. Additionally, the output information of a raindrop sensor 273 or an illuminance sensor 274 can be further input to the audio processor 275. In this case, for example, it is possible to cope with this by replacing the four-pin type second coupler 279 with a six-pin type coupler.

The audio processor 275 can make the volume of a notification sound larger than that at the normal time so that the cognitive effect of the notification sound is not reduced due to rain sound in a case where it is detected by the raindrop sensor 273 that it is raining. Additionally, the volume of the notification sound can be set to be made smaller than that at the normal time in a case where it is detected by the illuminance sensor 274 that it is night. Moreover, by applying a noise sensor or the like, the volume of the notification sound can be set to be made larger, for example, in a case where the surrounding noise is loud due to heavy traffic or the like.

Figure 16:
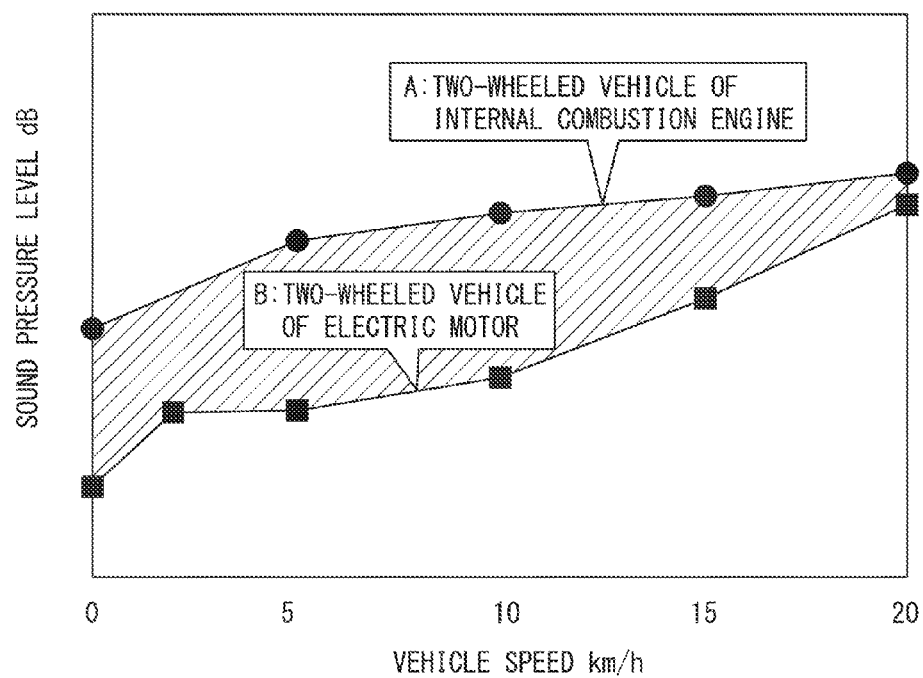
FIG. 16 is a graph showing the relationship between a vehicle speed and a traveling sound in the motorcycle of FIG. 14.

FIG. 16 is a graph showing the relationship between a vehicle speed and a traveling sound in a two-wheeled vehicle of an internal combustion engine and a two-wheeled vehicle of an electric motor. This graph shows A: two-wheeled vehicle of internal combustion engine, and B: two-wheeled vehicle of electric motor (equivalent to the motorcycle 201), respectively. If these respective two-wheeled vehicles are compared, a relatively large difference between noise levels seen from starting to a vehicle speed of 10 km/h becomes smaller with an increase in the vehicle speed and the difference between the noise levels is relatively small at a vehicle speed of 20 km/h.

As described above, in the vehicle approach notification device 250 of the saddle-ridden electric-powered vehicle related to the present embodiment, in order to realize a cognitive sound equivalent to the two-wheeled vehicle of the internal combustion engine, the notification sound is set so as to be output from the speaker 251 at such a volume that a shaded area that is the difference between B: two-wheeled vehicle of electric motor and A: two-wheeled vehicle of internal combustion engine is made up for. Additionally, the notification sound of the speaker 251 is set not to be output if the vehicle speed exceeds 20 km/h.

That is, the intermediate rotation number X2 of FIG. 12 is set to the upper limit of a speed zone where the difference between the noise levels is relatively large, and the sound stop rotation number X3 is set from a speed (20 km/h in the present embodiment) at which the difference between the noise levels is relatively small.

FIG. 17 is a flowchart showing procedure of approach notification sound output control. The motor rotation number Nm is detected on the basis of the information from the PDU 252 in Step S1, and the vehicle speed V is detected on the basis of the information from the PDU 252 in Step S2. In Step S3, it is determined whether or not the motor rotation number Nm is lower than or equal to an upper limit NL. This upper limit NL is set to the connection rotation number of the centrifugal clutch disposed at an output transmission path of the electric motor M.

In Step S4, a notification sound is output from the speaker 251 so that volume become larger according to an increase in the motor rotation number Nm. Then, in Step S5, it is determined whether or not the motor rotation number Nm has exceeded the upper limit NL. If the answer is determined to be positive, the processing proceeds to Step S6, and if the answer is determined to be negative, the processing returns to Step S4. That is, in a non-traveling state until the centrifugal clutch is connected, a notification sound is output so as to become larger according to the rotation number of the electric motor M.

In Step S6, it is determined whether or not the vehicle speed V is lower than or equal to the upper limit VL. In the present embodiment, this upper limit VL is set to the vehicle speed of 20 km/h. If the answer is determine to be positive in Step S6, the processing proceeds to Step S7, and a notification sound is output so as to make up for a difference from a target volume according to an increase in the vehicle speed V. In the present embodiment, as shown in the graph of FIG. 16, a notification sound is output so as to make up for the shaded portion between A: two-wheeled vehicle of electric motor and B: two-wheeled vehicle of internal combustion engine.

The volume of the notification sound at each predetermined vehicle speed can be set in advance as volume data in conformity with each vehicle from experiments or the like, and the setting data can be stored in the EEPROM 271 of the control unit 260. In the present embodiment, setting is made so as to output a traveling sound equivalent to a first class vehicle with a motor mounting a 50-cc engine corresponding to the vehicle rank of the motorcycle 201. However, for example, in a case where the vehicle rank of the motorcycle 201 is equivalent to an ordinary two-wheeled vehicle, a traveling sound equivalent to an ordinary two-wheeled vehicle that mounts a 400-cc engine can be made to be output. In addition, the relationship between the vehicle rank of the motorcycle 201 and the volume of the notification sound can be arbitrarily set according to vehicle classification, license classification, or the like in the Road Traffic Law.

Then, in Step S8, it is determined whether or not the vehicle speed V has exceeded the upper limit VL. If the answer is determined to be positive, the processing proceeds to Step S9, the output of the notification sound is stopped, and a series of control ends. In addition, if the answer is determined to be negative in Step S6, the processing proceeds to Step S9. On the other hand, if the answer is determined to be negative in Step S8, the processing returns to Step S7.

According to the approach notification sound output control that was described above, it is possible to output an approach notification sound at a volume matching with the actual traveling sound of an internal combustion engine vehicle as compared to a control method that increases volume only on the basis of an increase in the motor rotation number or vehicle speed. Specifically, control can be made so as to output a traveling sound equivalent to an internal combustion engine vehicle corresponding to the vehicle rank or vehicle classification of the motorcycle 201. Moreover, as the tone of the approach notification sound, various kinds of tones can be selected in addition to recording data depending on an internal combustion engine vehicle corresponding to the vehicle rank or vehicle classification of the motorcycle 201.

In addition, the structure, arrangement, or the like of the control unit 260 that controls the speaker 251 that outputs a notification sound is not limited to the above embodiments, and various changes can be made. For example, as described above, the vehicle approach notification device 250 is not applied only to the two-wheeled electric vehicle, and can be applied to various electric-powered vehicles, such as saddle-ridden three or four-wheeled vehicles.

Additionally, the cooling air introduction ducts 245 may cool the electric motor M in addition to the high-voltage battery 248, the control unit 260, and the PDU 252, for example, by supplying a cooling wind to the electric motor M. In other words, the cooling air introduction ducts 245 may cool at least one of the high-voltage battery 248, the control unit 260, PDU 252, and the electric motor M.

Moreover, it is also possible to appropriately combine the configurations or controls of the above embodiments. That is, the Helmholtz resonator or the harmonica may be used for some or all of the sound emission devices of the fourth and fifth embodiments, the speaker may be used for some or all of the sound emission devices of the first to third embodiments, or the controls of the fourth and fifth embodiment may be replaced with each other.

The configurations in the above respective embodiments are examples of the invention, and various changes can be made without departing from the scope of the invention.

INDUSTRIAL APPLICABILITY

According to the vehicle approach notification device of the saddle-ridden electric-powered vehicle of the invention, a simulation sound which is audible for a rider or a pedestrian can be generated.

REFERENCE SIGNS LIST 10, 101, 201: MOTORCYCLE (SADDLE-RIDDEN ELECTRIC-POWERED VEHICLE)
36: HELMHOLTZ RESONATORS (SOUND EMISSION DEVICE)
36': HARMONICA
160, 251: SPEAKER (SOUND EMISSION DEVICE)
40, 40', 40", 140, 250: VEHICLE APPROACH NOTIFICATION DEVICE OF SADDLE-RIDDEN ELECTRIC-POWERED VEHICLE
11, 111, 234: VEHICLE BODY FRAME
12, 112, 236: HEAD PIPE
33, 121a, 207A: FRONT COVER
41: AIR OPENING
143a, 245a: INTAKE PORT (AIR OPENING)
42, 143b, 243: VENTILATION PASSAGE
49: DUCT PART
143: INTAKE DUCT (DUCT)
245: COOLING AIR INTRODUCTION DUCT (DUCT)
31: ELECTRIC MOTOR (POWER ENGINE)
103: MOTOR UNIT (ELECTRIC MOTOR, POWER ENGINE)
M: ELECTRIC MOTOR (POWER ENGINE)
23: ELECTRIC COMPONENT
135, 260: CONTROL UNIT (ELECTRIC COMPONENT)
252: PDU (ELECTRIC COMPONENT)
25: FUEL CELL (ELECTRIC COMPONENT)
102: MAIN BATTERY (ELECTRIC COMPONENT)
248: HIGH-VOLTAGE BATTERY (ELECTRIC COMPONENT)
15, 105, WF: FRONT WHEEL
14, 106, 202: FRONT FORK
14a, 106c, 202a: CENTRAL AXIS

The invention claimed is:
1. A vehicle approach notification device of a saddle-ridden electric-powered vehicle that has a sound emission device attached to a vehicle body of a saddle-ridden electric-powered vehicle including an electric motor in a power engine and that outputs a notification sound for notifying approach of the saddle-ridden electric-powered vehicle from the sound emission device to the surroundings, wherein the saddle-ridden electric-powered vehicle includes a front cover that covers the periphery of the head pipe of the vehicle body frame, wherein the sound emission device is located inside the front cover, wherein the front cover is provided with an air opening for taking in air from an outside, and the ventilation passage that is a passage of the air taken in from the air opening, and is used for cooling at least one of a power engine and electric components of the saddle-ridden electric-powered vehicle wherein the sound emission device is arranged in the ventilation passage, wherein the sound emission device is arranged at an upper portion of the ventilation passage, and emits sound into the ventilation passage, wherein upper portions of front forks that extend obliquely forward and downward in order to hang a front wheel are steerably supported by the head pipe, and wherein at least a portion of the sound emission device is arranged ahead of an axis of the front forks.

2. The vehicle approach notification device of a saddle-ridden electric-powered vehicle according to claim 1, wherein the sound emission device is arranged at an upper portion of the ventilation passage within the ventilation passage, and emits sound into the ventilation passage.

3. The vehicle approach notification device of a saddle-ridden electric-powered vehicle according to claim 1, wherein the ventilation passage is formed by a duct that extends from a front position of the head pipe to a rearward position within the front cover, and wherein the sound emission device is arranged at an upper wall portion of the duct and emits sound into the ventilation passage.

4. The vehicle approach notification device of a saddle-ridden electric-powered vehicle according to claim 1, wherein the duct is a wind guide duct that crosses a side of the head pipe, and opens toward a front of the vehicle.

5. The vehicle approach notification device of a saddle-ridden electric-powered vehicle according to claim 1, wherein the duct is a cooling duct that cools a battery for traveling.

6. The vehicle approach notification device of a saddle-ridden electric-powered vehicle according to claim 1, wherein the frequency of emitted sound of the sound emission device is from 100 Hz to 800 HZ.

* * * * *